(12) United States Patent
Banno et al.

(10) Patent No.: US 10,780,776 B2
(45) Date of Patent: Sep. 22, 2020

(54) VEHICLE UNDERBODY

(71) Applicant: TOYOTA JIDOSHA KABUSHIKI KAISHA, Toyota-shi (JP)

(72) Inventors: Shuhei Banno, Miyoshi (JP); Yasuyuki Kumazawa, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 16 days.

(21) Appl. No.: 16/359,351

(22) Filed: Mar. 20, 2019

(65) Prior Publication Data
US 2019/0291573 A1  Sep. 26, 2019

(30) Foreign Application Priority Data
Mar. 23, 2018 (JP) ................. 2018-057276

(51) Int. Cl.
| B60K 15/06 | (2006.01) |
| B60K 15/067 | (2006.01) |
| B62D 25/20 | (2006.01) |
| B60K 1/04 | (2019.01) |
| B60K 15/063 | (2006.01) |

(52) U.S. Cl.
CPC .............. B60K 15/067 (2013.01); B60K 1/04 (2013.01); B62D 25/2009 (2013.01); B60K 2001/0438 (2013.01); B60K 2015/0634 (2013.01)

(58) Field of Classification Search
CPC ............... B60K 15/067; B60K 1/04; B60K 2015/0634; B60K 2001/0438; B62D 25/2009

USPC ........................................... 296/204, 187.12
See application file for complete search history.

(56) References Cited

U.S. PATENT DOCUMENTS

| 2008/0283316 A1* | 11/2008 | Ono ................... B60L 50/71 180/68.5 |
| 2009/0058142 A1* | 3/2009 | Park ................... B62D 21/00 296/193.07 |
| 2012/0267918 A1* | 10/2012 | Murata .............. B62D 25/2027 296/204 |
| 2016/0200191 A1 | 7/2016 | Ito et al. |
| 2017/0106743 A1 | 4/2017 | Ajisaka |

FOREIGN PATENT DOCUMENTS

| JP | 2006-168527 | 6/2006 |
| JP | 2014-151891 | 8/2014 |
| JP | 2016-130103 | 7/2016 |
| JP | 2017-077782 | 4/2017 |
| JP | 2017-087869 | 5/2017 |
| JP | 2017-149316 | 8/2017 |

* cited by examiner

*Primary Examiner* — Joseph D. Pape
(74) *Attorney, Agent, or Firm* — Oblon, McClelland, Maier & Neustadt, L.L.P.

(57) ABSTRACT

A vehicle understructure includes a hydrogen tank that is disposed along a longitudinal axis of a vehicle. At least an upper portion of the hydrogen tank is enclosed in a floor tunnel. The hydrogen tank includes dome portions that are disposed at both ends of a cylindrical center body portion of the tank, and at least one valve portion that protrudes from at least one of the dome portions. The vehicle understructure also includes a brace that extends along a transverse axis of the vehicle and is secured to transversely outer side portions of the floor tunnel. The brace is at least partially overlapped with at least one of the dome portions when viewed from the front or rear of the vehicle.

12 Claims, 19 Drawing Sheets

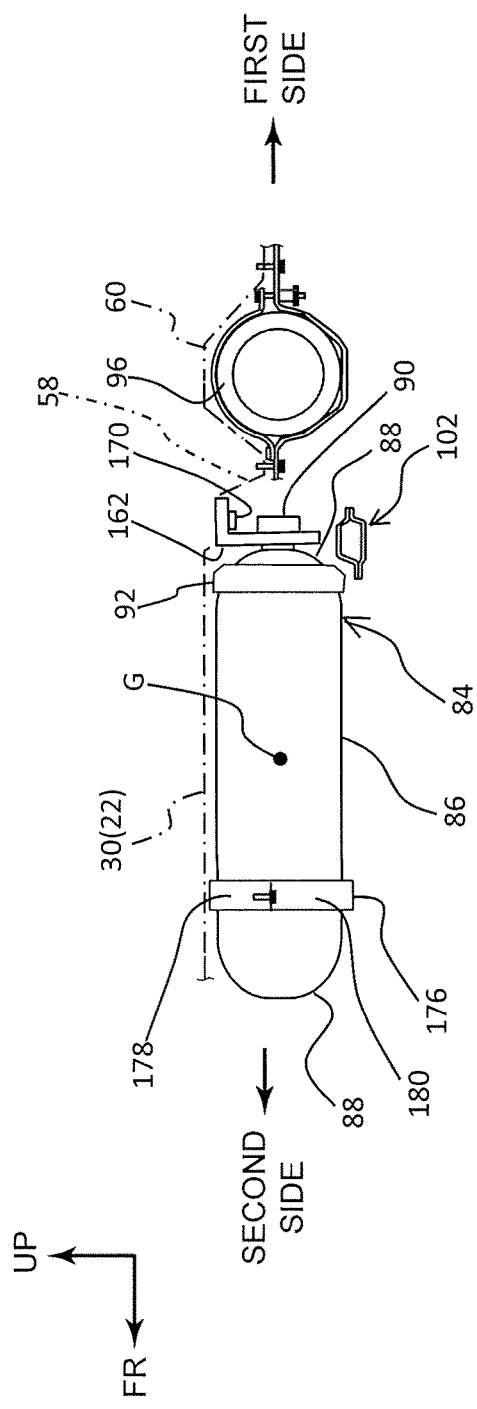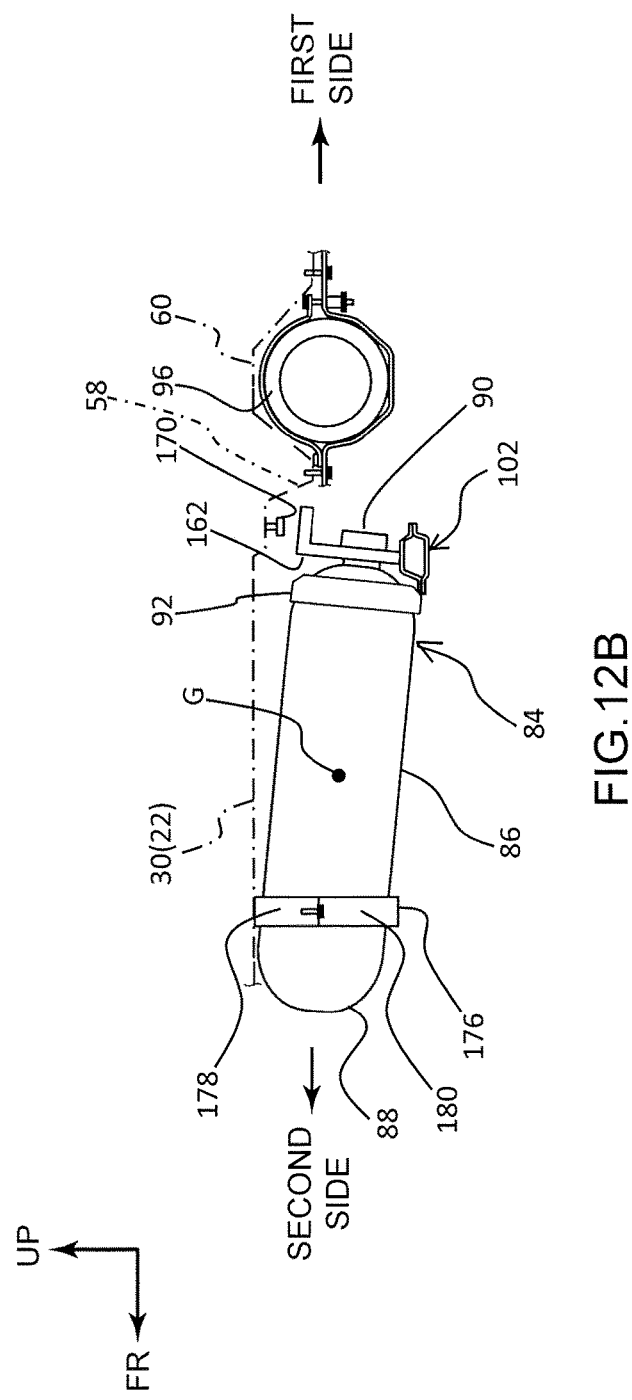

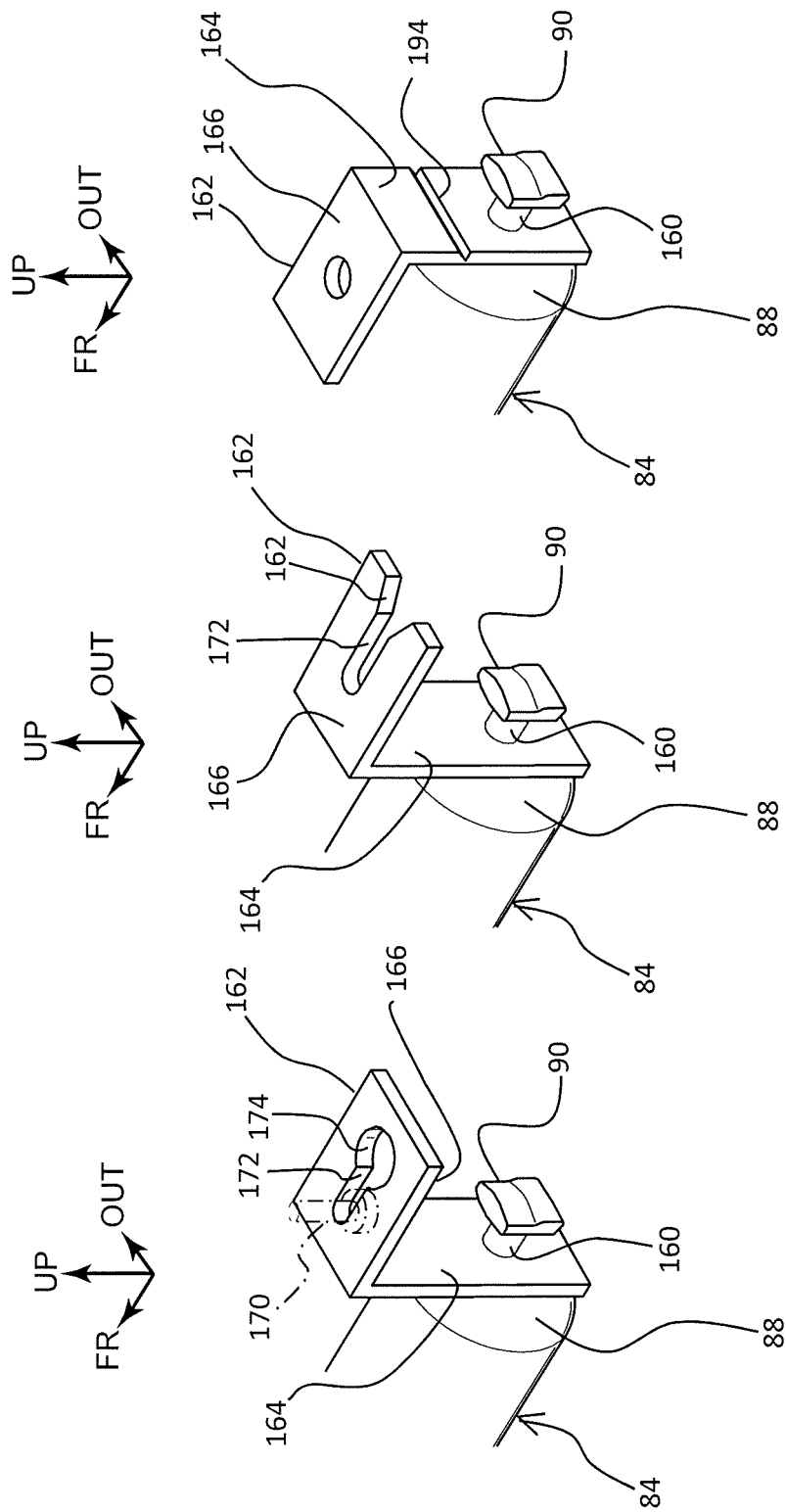

VEHICLE UNDERBODY

CROSS REFERENCE TO RELATED APPLICATION

This application claims priority to Japanese Patent Application No. 2018-057276 filed on Mar. 23, 2018, which is incorporated herein by reference in its entirety including the specification, claims, drawings, and abstract.

TECHNICAL FIELD

The present disclosure relates to a vehicle underbody.

BACKGROUND

Vehicle structures are known in which a tank is disposed along a longitudinally-oriented floor tunnel at the transverse center of a floor panel. For example, in a vehicle underbody disclosed in JP 2006-168527A, a gas fuel tank having a long length and a small outer diameter is achieved by disposing the gas fuel tank under a floor tunnel along the longitudinal axis of the vehicle. In this way, the gas fuel tank is disposed in the floor tunnel that does not excessively protrude inside a passenger compartment.

In JP 2006-168527A, the tank is structured to have a ground height equal to a vehicle frame, such as side sills, center frames, and triggers on both sides to achieve a wide passenger compartment by lowering a floor of the vehicle.

The floor tunnel of a vehicle is opened downwards. When a steering wheel is turned or during driving, the vehicle may rock to cause widening of the downward opening of the floor tunnel. When the floor tunnel rocks greatly, operational stability of the vehicle may be deteriorated. In the vehicle body frame structure disclosed in JP 2006-168527A, a reinforcing member (support frame) is disposed below the tank under the floor tunnel to enhance the rigidity of the vehicle body frame and reduce rocking that may cause widening of the opening of the floor tunnel. However, because the reinforcing member is disposed below the body portion of the tank, the reinforcing member protrudes downwards lower than the body portion of the tank for the height of the reinforcing member. Because the height from the ground (ground height) must be considered to design an underbody of a vehicle, such a structure decreases flexibility in design.

In consideration of the above situation, an object of the present disclosure is to provide a vehicle underbody which can enhance operational stability of a vehicle by a reinforcing member and reduce a downward protrusion of a reinforcing member lower than the body of a tank.

SUMMARY

A vehicle understructure according to one aspect of the present disclosure includes right and left rocker panels that extends along a longitudinal axis of a vehicle on both of transversely outer sides of the vehicle and forms a vehicle body frame, and a floor tunnel that forms a substantially transversely center portion of a floor panel between the right and left rocker panels. The floor tunnel extends along the longitudinal axis of the vehicle. The vehicle understructure also includes a tank with at least an upper portion enclosed in the floor panel. The tank is disposed along the longitudinal axis of the vehicle. The tank includes two dome portions that are disposed at both of a first end and a second end of a longitudinally centered cylindrical body portion, and at least one valve portion that protrudes from the dome portions at least on the first side. The vehicle understructure further includes a reinforcing member that extends along a transverse axis of the vehicle and is secured to both of transversely outer side portions of the floor tunnel. The reinforcing member is at least partially overlapped with at least one of the dome portions when viewed from the front or rear of the vehicle.

According to a vehicle underbody of the present disclosure, because the reinforcing member is secured to both of the transversely outer side portions of the floor tunnel, opening of the floor tunnel during driving can be reduced, enhancing operational stability of the vehicle. Further, because the reinforcing member is disposed to at least partially overlap one of the dome portions when viewed from the front or rear of the vehicle, the amount of downward protrusion of the reinforcing member below the body portion of the tank can be reduced.

According to a vehicle underbody of another aspect of the present disclosure, the reinforcing member may be positioned to be at least partially overlapped with at least one of the dome portions when viewed from the front or rear of the vehicle, and also with at least one of the dome portions or at least one valve portion when viewed from the top or bottom of the vehicle.

In this way, because the reinforcing member may be disposed in space around the dome portion or the valve portion, the amount of downward protrusion of the reinforcing member below the body portion of the tank can be reduced.

According to a vehicle underbody of yet another aspect of the present disclosure, the vehicle underbody may further include a holder that holds the tank on the first side of the tank to the center of gravity of the tank. The holder may be configured to release the tank in response to a longitudinal relative movement between the floor tunnel and the tank. The vehicle underbody may also include a tank band that holds the tank on the second side of the tank to the center of gravity of the tank. The reinforcing member may be disposed on at least the first side of the tank.

When the floor tunnel is deformed due to collision loads applied to the vehicle, the tank is released from the holder that holds the one side of the tank in response to a longitudinal relative movement between the floor tunnel and the tank. Then, the tank is tilted such that the end of the tank on the one side is lowered in relation to the end of the tank on the other side. In this way, because the tank can be inhibited from being longitudinally compressed in the floor tunnel, the loads applied to the tank can be reduced. Because the reinforcing member is disposed on the one side of the tank to be at least partially overlapped with the body portion of the tank when viewed from the front or rear of the vehicle and also with the at least one of the dome portions or at least one valve portion when viewed from the top or bottom of the vehicle, the reinforcing member that supports the dome portion and the valve portion can inhibit the dome portion and the valve portion from being strongly hit against the ground, under cover, or other elements.

According to a vehicle underbody of yet another aspect of the present disclosure, the reinforcing member may be curved in a section where the reinforcing member is overlapped with at least one of the dome portions when viewed from the front or rear of the vehicle to protrude to be away from the body portion of the tank in comparison with both ends of the reinforcing member. An edge of the reinforcing member facing the body portion of the tank may be curved downward to be lower than both of the ends of the reinforcing member at least partially in a transverse section where the reinforcing member is overlapped with the at least one of the dome portions of the tank when viewed from the front or rear of the vehicle.

The curved reinforcing member may be disposed in the space around the dome portion or the valve portion. In this way, the amount of downward protrusion of the reinforcing member below the portion of the tank can be reduced in comparison with the reinforcing member that is not curved.

According to a vehicle underbody of yet another aspect of the present disclosure, the vehicle underbody may further include right and left inner closed cross sectional portions that extend along the longitudinal axis of the vehicle on both transversely outer sides of the floor tunnel. Each of the inner closed cross sectional portions may form a closed cross section with the floor panel when viewed from the front or rear of the vehicle. The vehicle underbody may also include right and left closed cross sectional portions that extend along the longitudinal axis of the vehicle on transversely inner sides to the right and left rocker panels and on transversely outer sides to the right and left inner closed cross sectional portions. Each of the outer closed cross sectional portions may form a closed cross section with the floor panel when viewed from the front or rear of the vehicle. The vehicle underbody may further include the reinforcing member that is secured to the right and left inner closed cross sectional portions and the right and left outer closed cross sectional portions.

In this way, because the reinforcing member is secured to the right and left outer closed cross sectional portions and the right and the left inner closed cross sectional portions, rocking of the bottom of the vehicle can be reduced, enhancing operational stability of the vehicle.

According to a vehicle underbody of yet another aspect of the present disclosure, the floor panel may include a tunnel panel that defines the floor tunnel, and right and left floor panels that are disposed on transversely outer sides of the tunnel panel and coupled to the tunnel panel from the transversely outer sides. The tunnel panel may include right and left side edges that are both bent back upwards, a right side flange that extends transversely outwards from the right side edge, and a left side flange extending transversely outwards from the left side edge. The right inner closed cross sectional portion may be formed between the tunnel panel and the right floor panel by coupling the right side flange to a lower surface of the right floor panel. The left inner closed cross sectional portion may be formed between the tunnel panel and the left floor panel by coupling the left side flange to a lower surface of the left floor panel. Right and left under reinforcements may extend along the longitudinal axis of the vehicle and be respectively disposed on transversely outer sides of the right and left inner closed cross sectional portions. The right under reinforcement may be coupled to the lower surface of the right floor panel. The left under reinforcement may be coupled to the lower surface of the left floor panel. The right outer closed cross sectional portion may be formed between the right under reinforcement and the right floor panel. The left outer closed cross sectional portion may be formed between the left under reinforcement and the left floor panel.

In this way, because the reinforcing member is secured to the right and left outer closed cross sectional portions and the right and left inner closed cross sectional portions, rocking of the bottom of the vehicle can be reduced, enhancing operational stability of the vehicle.

According to a vehicle underbody of yet another aspect of the present disclosure, a floor cross member may extend along the longitudinal axis of the vehicle and be connected to rear end portions of the right and left floor panels, and also to rear end portions of the right and left rocker panels. The floor cross member may include a bottom surface facing downward and a rear surface facing rearward. Two rear end brackets may be attached to rear end portions of the right and left under reinforcements and also to the bottom surface and the rear surface of the floor cross member. Each of the two rear end brackets may have a substantially L-shape when viewed from a side of the vehicle. The valve portion may be disposed between the rear ends portions of the right and left under reinforcements. The reinforcing member may be disposed to be overlapped with the at least one valve portion when viewed from the top or bottom of the vehicle.

In this way, because the rear end brackets securely fasten the floor cross member and the under reinforcements and the transversely-oriented reinforcing member is secured to the right and left outer closed cross sectional portions and the right and left inner closed cross sectional portions, the rigidity of the tunnel around the rear end is increased. Because the opening of the tunnel can be further inhibited, operational stability of the vehicle can be enhanced.

According to a vehicle underbody of yet another aspect of the present disclosure, the reinforcing member may substantially linearly extend along the transverse axis of the vehicle when viewed from the front or rear of the vehicle between right and left joints where the reinforcing member is secured to the right and left outer closed cross sectional portions.

In this way, because of the rigidity of the reinforcing member against longitudinal loads, the opening of the tunnel can be further inhibited, enhancing operational stability of the vehicle.

According to a vehicle underbody of yet another aspect of the present disclosure, the reinforcing member may include a first reinforcing element that is secured to both of the transversely outer side portions of the floor tunnel, and a second reinforcing element that is coupled to the first reinforcing element and transversely extends along the first reinforcing element. The first reinforcing element and the second reinforcing element may be at least partially overlapped with each other and further with at least one of the dome portions or at least one valve portion, when viewed from the top or bottom of the vehicle.

In this way, because the reinforcing member includes the second reinforcing element in addition to the first reinforcing element, impact from the bottom of the vehicle can be effectively inhibited from being transmitted to the dome portions or the valve portion. Further, because the second reinforcing element is aligned with the first reinforcing element along the transverse axis of the vehicle, the rigidity of the reinforcing member against transverse loads can be improved. In this way, widening of the opening of the floor tunnel during driving can be inhibited, enhancing operational stability of the vehicle.

According to a vehicle underbody of yet another aspect of the present disclosure, the first reinforcing element and the second reinforcing element may be coupled to each other to form a closed cross sectional portion having a closed cross section when viewed from a side of the vehicle. The closed cross sectional portion of the first and the second reinforcing elements may extend along the transverse axis of the vehicle and is overlapped with at least one of the dome portions or at least one valve portion at least when viewed from the top or bottom of the vehicle.

In this way, because the first reinforcing member and the second reinforcing member form a closed cross section that extends along the transverse axis of the vehicle, widening of the opening of the floor tunnel can be further inhibited, enhancing operational stability of the vehicle. Further, because the rigidity of the reinforcing member against loads from the bottom of the vehicle can be improved, the tank can be effectively protected.

According to a vehicle underbody of yet another aspect of the present disclosure, the second reinforcing element may extend further on transversely outer sides than joints where the first reinforcing element is attached to the transversely outer side portions of the floor tunnel. The closed cross sectional portion may extend further on transversely outer sides than the joints where the first reinforcing element is attached to the transversely outer side portions of the floor tunnel.

In this way, because the closed cross sectional portion extends further on transversely outer sides than joints where the first reinforcing element is attached to the transversely outer side portions of the floor panel, the rigidity of the reinforcing member around the joints of the first reinforcing element can be improved, enhancing operational stability of the vehicle. Further, because the impact from the bottom of the vehicle can be efficiently dispersed to the floor panel, the impact from below the vehicle can be effectively inhibited from being transmitted to the tank.

A vehicle underbody according to the present disclosure can enhance operational stability of a vehicle by a reinforcing member and reduce a downward protrusion of a reinforcing member lower than the body of a tank.

BRIEF DESCRIPTION OF DRAWINGS

Embodiment(s) of the present disclosure will be described by reference to the following figures, wherein:

FIG. 12A is a schematic diagram of a first hydrogen tank in a hold state in which the first hydrogen tank is held with a neck mount;

FIG. 12B is a schematic diagram of a first hydrogen tank in a released state in which the first hydrogen tank is released from the neck mount;

FIG. 13A shows enlarged perspective views of neck mounts holding the first hydrogen tank FIG. 13B shows different embodiments of the neck mounts;

FIG. 13C shows different embodiments of the neck mounts;

DESCRIPTION OF EMBODIMENTS

Figure 1:
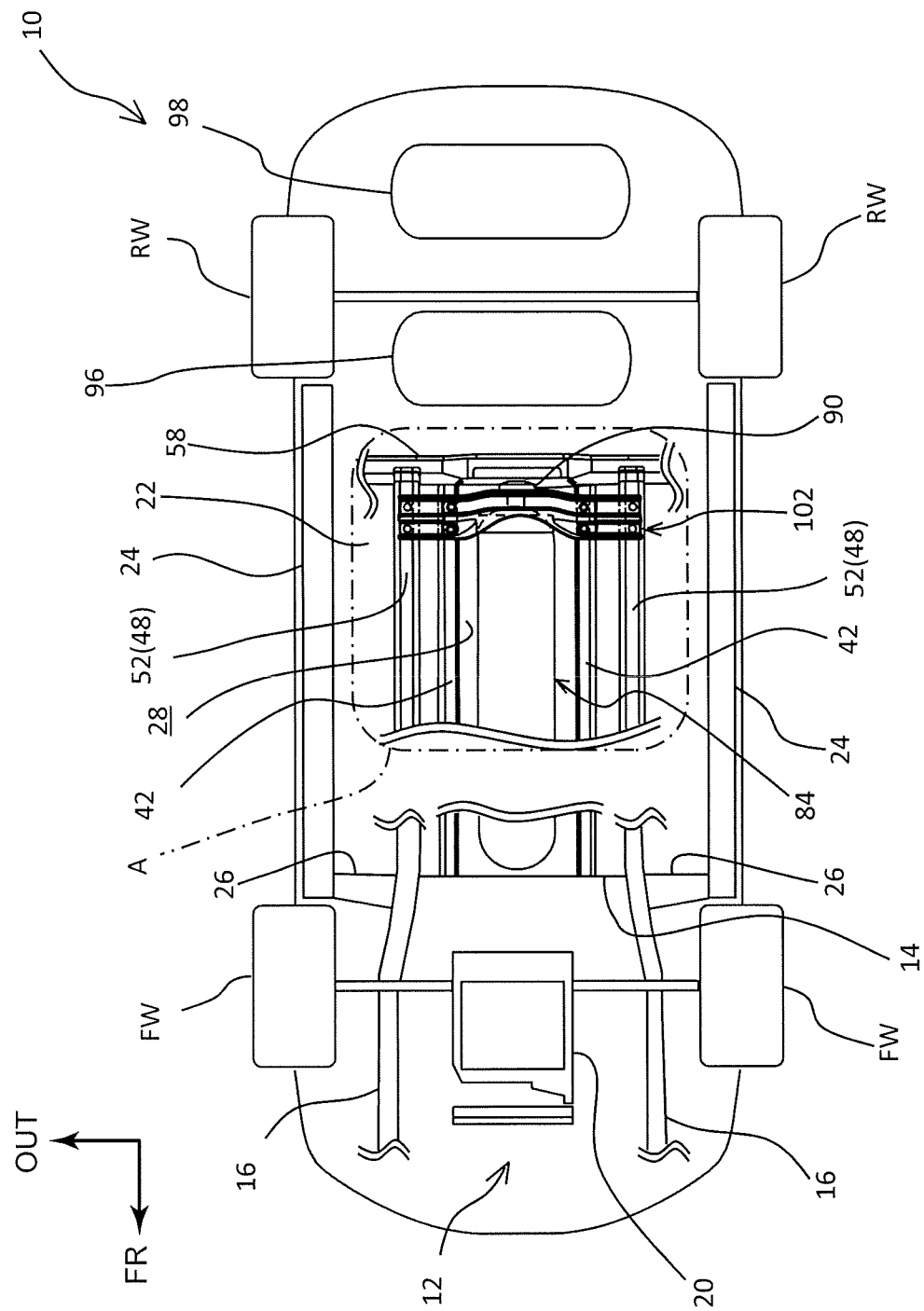
FIG. 1 is a bottom view of a vehicle underbody according to a first embodiment of the present disclosure.

Exemplary embodiments of a vehicle underbody according to the present disclosure are described below with reference to the attached drawings. For convenience of description, UP, FR, and OUT arrows in the drawings respectively indicate the up, front, and transversely outer directions of the vehicle. Unless otherwise specified, the vertical, longitudinal, and transverse directions in the description below respectively indicate the vertical, longitudinal, and transverse directions of the vehicle. Unless otherwise specified, the right and left directions in the description below respectively indicate the right and left of the vehicle as viewed by a passenger inside the vehicle looking ahead. The present invention is not limited to the embodiments described below. The descriptions below and the attached drawings are simplified as appropriate for convenience of description.

First Embodiment

As shown in FIG. 1, a power unit compartment 12 is provided at the front of a vehicle 10. The power unit compartment 12 is partitioned from a passenger compartment (not shown) with a dash panel 14. Right and left front side members 16 extend along a longitudinal axis of the vehicle on the right and left outer sides of the power unit compartment 12. The front side members 16 extend along the longitudinal axis of the vehicle along the shapes of the dash panel 14 and a floor panel 22 described below and are respectively connected to front ends of right and left under reinforcements 48 described below. The power unit compartment 12 encloses a drive unit 20 that rotary drives front wheels FW or rear wheels RW using electric power generated by a fuel cell stack (not shown).

At the bottom of the vehicle 10, the lower edge of the dash panel 14 is connected to the front edge of the floor panel 22 that forms a floor of the passenger compartment. Right and left rocker panels 24 extend along the longitudinal axis of the vehicle on the right and left outer sides of the floor panel 22. Each of the right and left rocker panels 24 includes, for example, a rocker outer panel on a transversely outer side and a rocker inner panel on a transversely inner side of the vehicle. Each of the rocker outer panel and the rocker inner panel has a cross section of a substantial hat shape with their opening sides opposing each other. Such an opposing coupling of the rocker outer panel and the rocker inner panel forms a hollow closed cross section of the rocker panel 24 when viewed from the front or rear of the vehicle. As shown in FIG. 1, the front ends of the right and left rocker panels 24 are connected to the right and left front side members 16 via right and left transversely-extending torque boxes 26, respectively. In such an exemplary structure, the right and left rocker panels 24 are disposed on both transversely outer sides of the vehicle 10 along the longitudinal axis of the vehicle to form a portion of a body frame of the vehicle 10.

Figure 2:
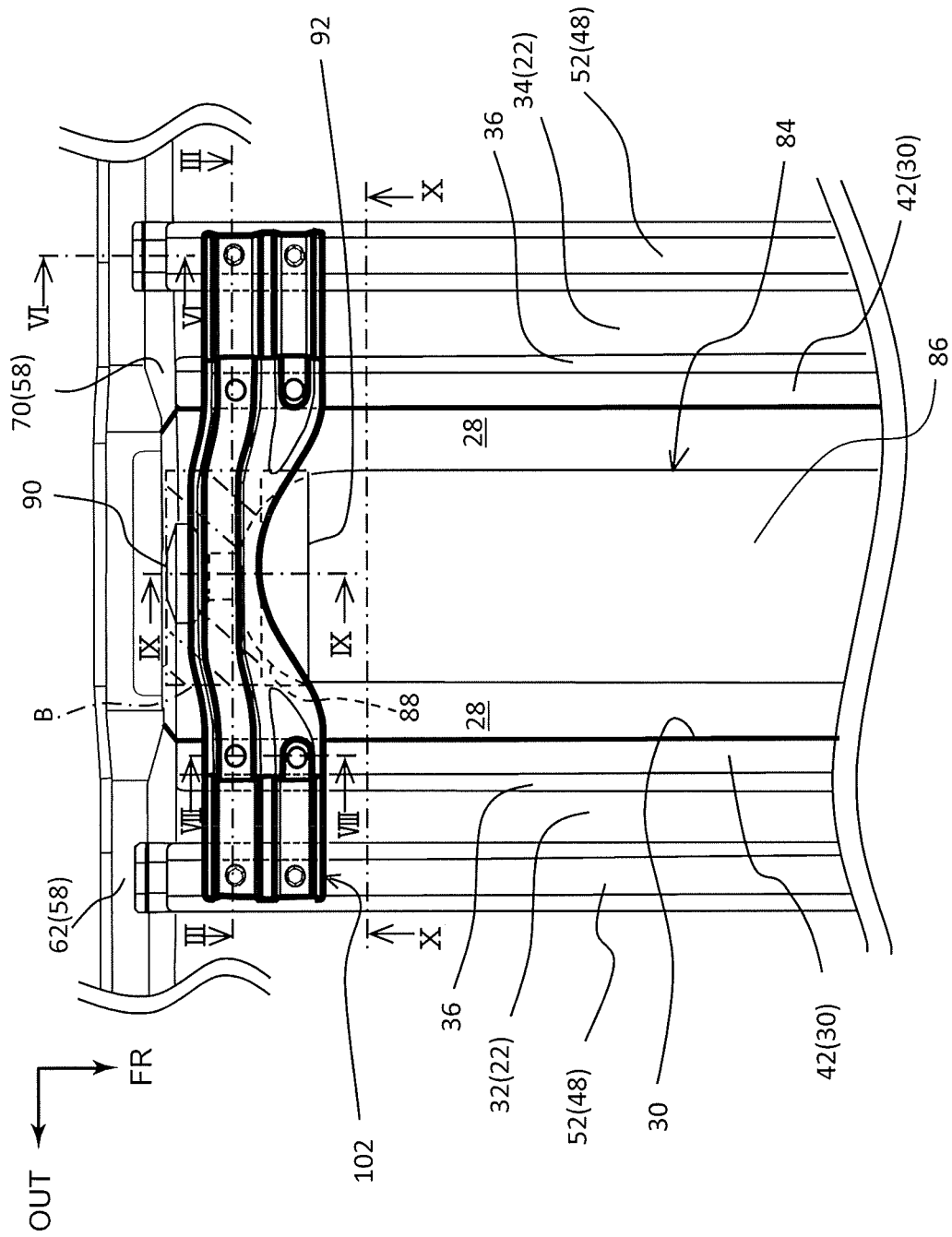
FIG. 2 is a bottom view of a vehicle showing an enlarged view of a portion A in FIG. 1.
Figure 3:
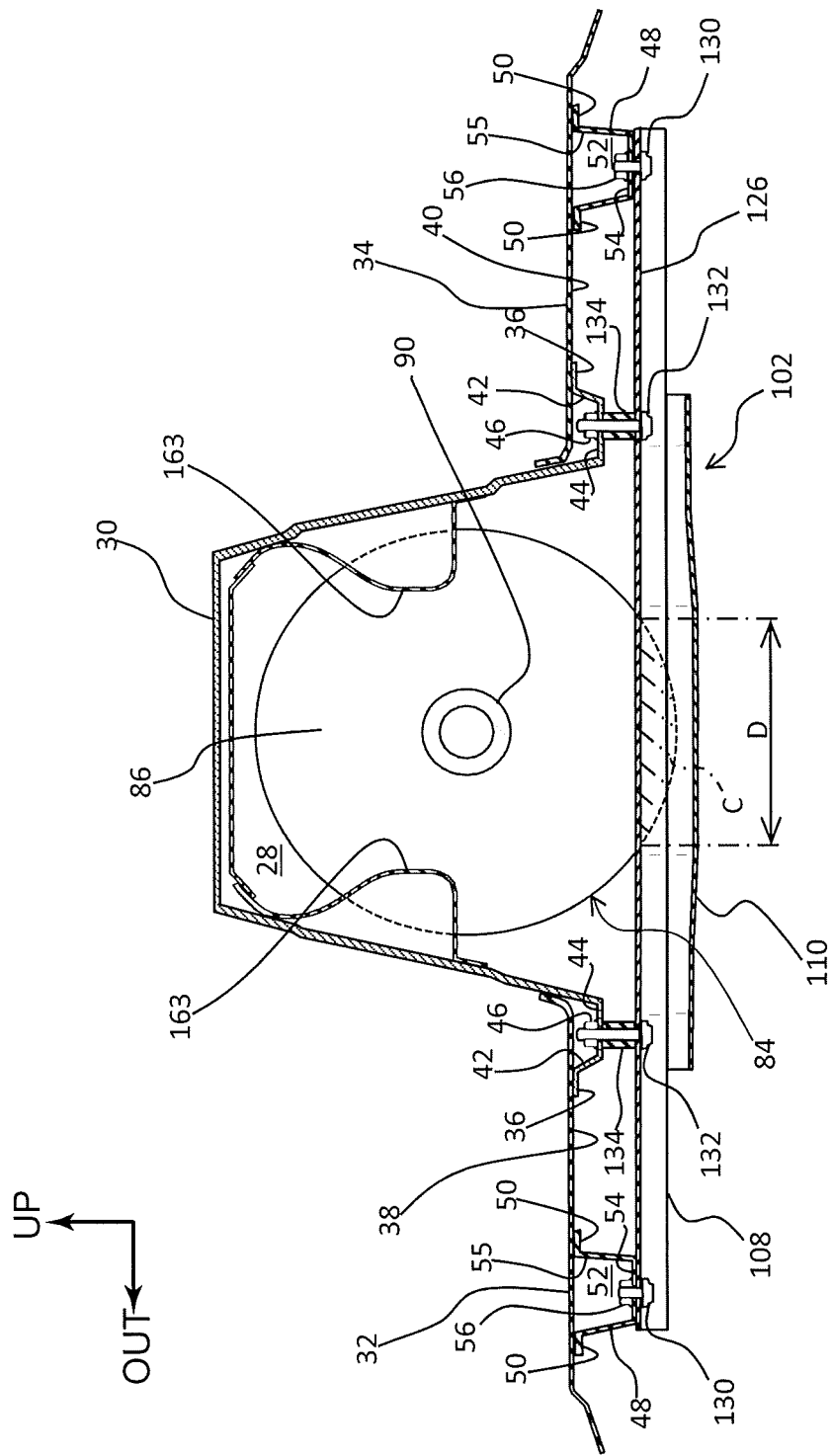
FIG. 3 is a cross section taken along line in FIG. 2, viewed from the rear of the vehicle.

As described above, the floor panel 22 is disposed between the right and left rocker panels 24 at the bottom of the vehicle 10. The floor panel 22 includes a floor tunnel 28 around the transversely center. In the present embodiment, as shown in FIGS. 2 and 3, the floor panel 22 integrally includes a tunnel panel 30 that forms the floor tunnel 28, and a left floor panel 32 and a right floor panel 34 disposed on respective sides of the tunnel panel 30. The left floor panel 32 and the right floor panel 34 are connected to the tunnel panel 30 from transversely outer sides. The floor panel 22 may be made from a single panel. An under cover (not shown) or any other elements may be disposed under the floor panel 22.

As shown in FIG. 3, the floor tunnel 28 is formed to have a cross section of a substantial inverted U-shape (opening downward), when viewed from the front or rear of the vehicle. The floor tunnel 28 extends along the longitudinal axis of the vehicle around a substantially transverse center of the vehicle 10 from the above described dash panel 14 at the front edge of the floor panel 22 to the rear edge of the floor panel 22. Although the floor tunnel 28 is formed around a substantially transverse center of the floor panel 22, the position may be displaced to some degree.

Both of the side edges of the tunnel panel 30 are bent back upwards. The tunnel panel 30 includes right and left side flange portions 36 that extend transversely outwards. The right and left side flange portions 36 are respectively connected to a lower surface 38 of the left floor panel 32 and a lower surface 40 of the right floor panel 34 by welding or other means. The transversely inner edges of the left floor panel 32 and the right floor panel 34 are both bent upwards and connected to the tunnel panel 30 from the transversely outer sides by welding or other means. The tunnel panel 30 forms a right inner closed cross sectional portion 42 between the tunnel panel 30 and the right floor panel 34, and a left inner closed cross sectional portion 42 between the tunnel panel 30 and the left floor panel 32. Each of the right and left inner closed cross sectional portions 42 has a closed cross section when viewed from the front or rear of the vehicle, and serves as a transversely outer side portion of the floor tunnel 28 on each side. In other words, in a cross section viewed from the front or rear of the vehicle, the right and left inner closed cross sectional portions 42 respectively form closed cross-sectional portions including the tunnel panel 30 and the right floor panel 34 or the left floor panel 32. As shown in FIG. 3, in the present embodiment, each of the right and left inner closed cross sectional portions 42 has a substantial rectangular cross section when viewed from the front or rear of the vehicle.

As shown in FIG. 2, the right and left side flange portions 36 of the tunnel panel 30 are formed along the floor tunnel 28. The right and left inner closed cross sectional portions 42 extend along the floor tunnel 28 along the longitudinal axis of the vehicle on both of the transversely outer sides of the floor tunnel 28. Each of the right and left inner closed cross sectional portions 42 includes, on a bottom surface 44, two bolt insertion through holes arranged in line along the longitudinal axis of the vehicle. Bolts 132 for securing upper braces 108 described below are inserted through the through holes. Two weld nuts 46 are secured on each of the bottom surface inside the right and left inner closed cross sectional portions 42 at positions corresponding to the through holes.

As shown in FIG. 2, the right and left under reinforcements 48 extend along the longitudinal axis of the vehicle on the transversely inner sides to the right and left rocker panels 24 and on the transversely outer sides to the right and left side flange portions 36 (right and left inner closed cross sectional portions 42). Specifically, each of the right and left under reinforcements 48 includes a flange portion 50 that extends from the upper edge of the right or left under reinforcements 48 towards a transversely, and has a cross section of a substantial hat shape with the opening facing upwards, when viewed from the front or rear of the vehicle. The flange portions 50 are respectively connected to the lower surface 40 of the right floor panel 34 and the lower surface 38 of the left floor panel 32 by welding or other means. The right and left under reinforcements 48 respectively form a right outer closed cross sectional portion 52 between the right under reinforcement 48 and the right floor panel 34, and a left outer closed cross sectional portion 52 between the left under reinforcements 48 and the left floor panel 32. Each of the right and left outer closed cross sectional portions 52 has a closed cross section when viewed from the front or rear of the vehicle. In other words, in a cross section viewed from the front or rear of the vehicle, the right and left outer closed cross sectional portions 52 respectively form closed cross-sectional portions including the right floor panel 34 or the left floor panel 32 and the right or left under reinforcement 48. As shown in FIG. 3, in the present embodiment, each of the right and left outer closed cross sectional portions 52 has a substantial rectangular cross section when viewed from the front or rear of the vehicle.

The right and left under reinforcements 48 are formed along the floor tunnel 28 along the longitudinal axis of the vehicle. Similarly to the right and left inner closed cross sectional portions 42, the right and left outer closed cross sectional portions 52 extend along the floor tunnel 28 along the longitudinal axis of the vehicle on the transversely outer sides of the floor tunnel 28. Each of the right and left outer closed cross sectional portions 52 includes, on a bottom surface, two bolt insertion through holes arranged in line along the longitudinal axis of the vehicle. Bolts 130 for securing the upper braces 108 described below are inserted through the through holes. Two weld nuts 56 are secured on each of the bottom surface inside the right and left outer closed cross sectional portions 52 at positions corresponding to the through holes. As shown in FIG. 3, the right and left inner closed cross sectional portions 42 have a shorter height in internal dimensions than those of the right and left outer closed cross sectional portions 52. In other words, the right and left inner closed cross sectional portions 42 protrude downward less from the floor panel 22 than do the right and left outer closed cross sectional portions 52.

Floor Cross Member

Figure 4:
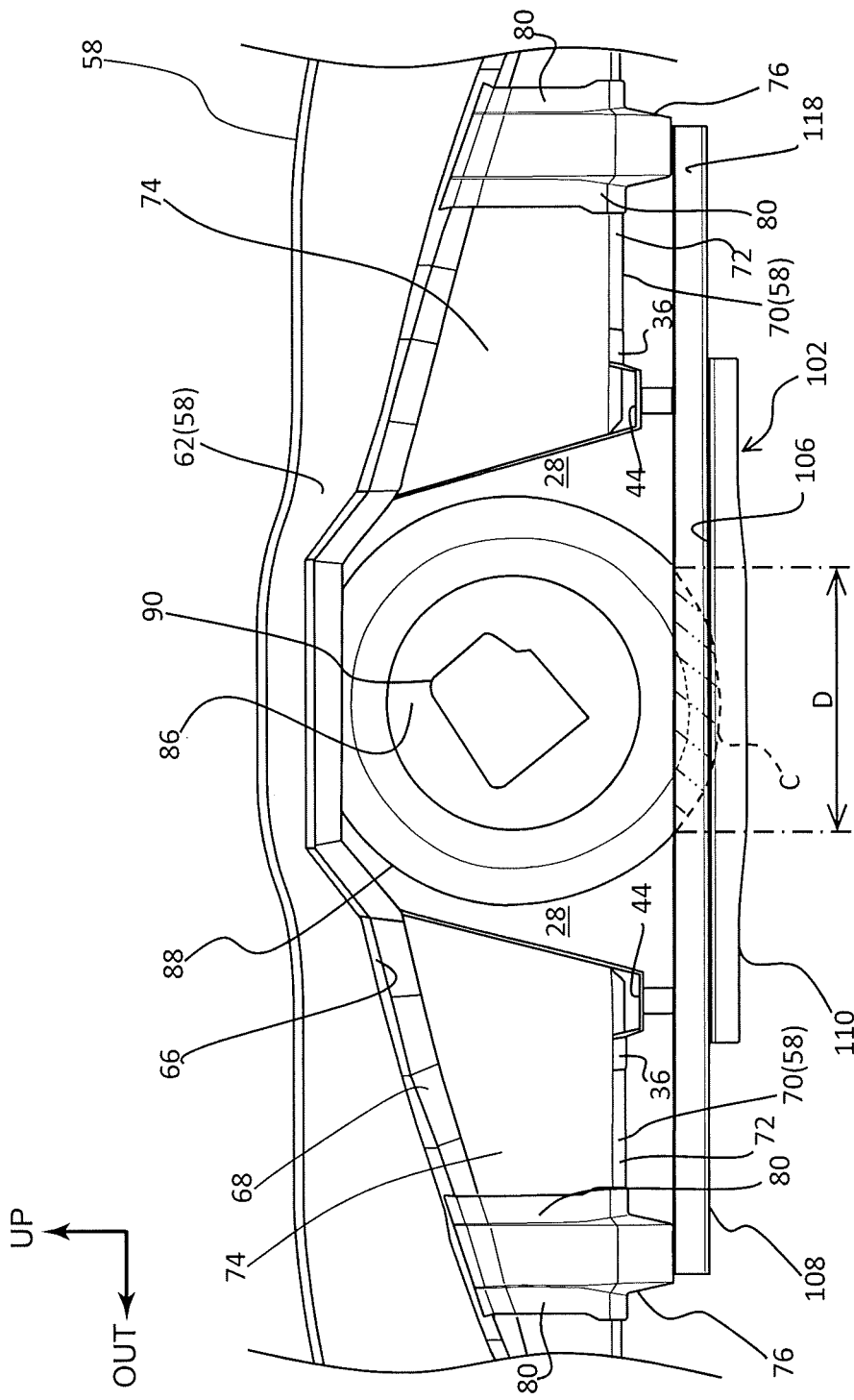
FIG. 4 is a vehicle underbody according to the first embodiment of the present disclosure viewed from the rear of the vehicle.
Figure 5:
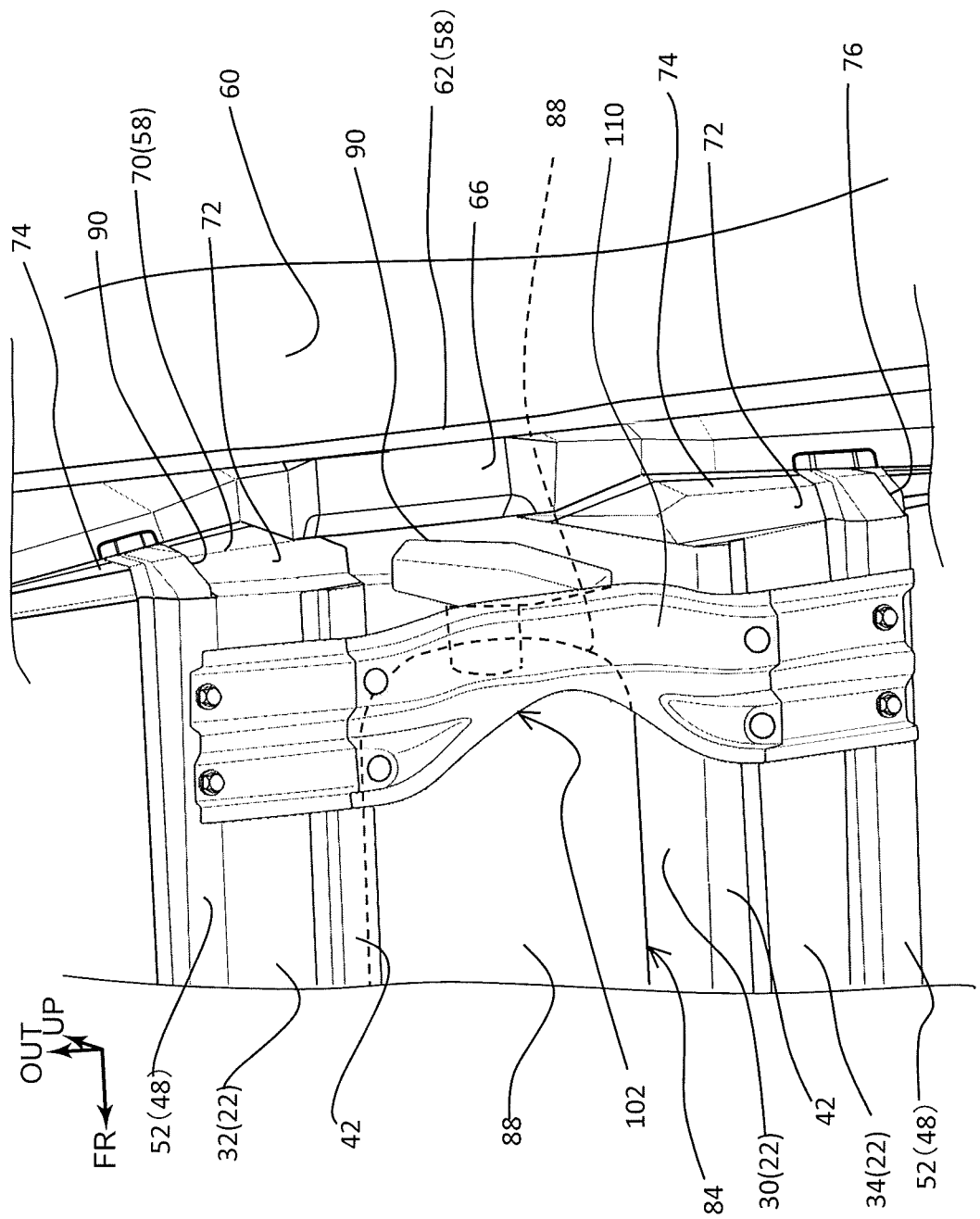
FIG. 5 is a perspective view of a vehicle underbody according to the first embodiment of the present disclosure, viewed from a lower outer side of the vehicle.
Figure 6:
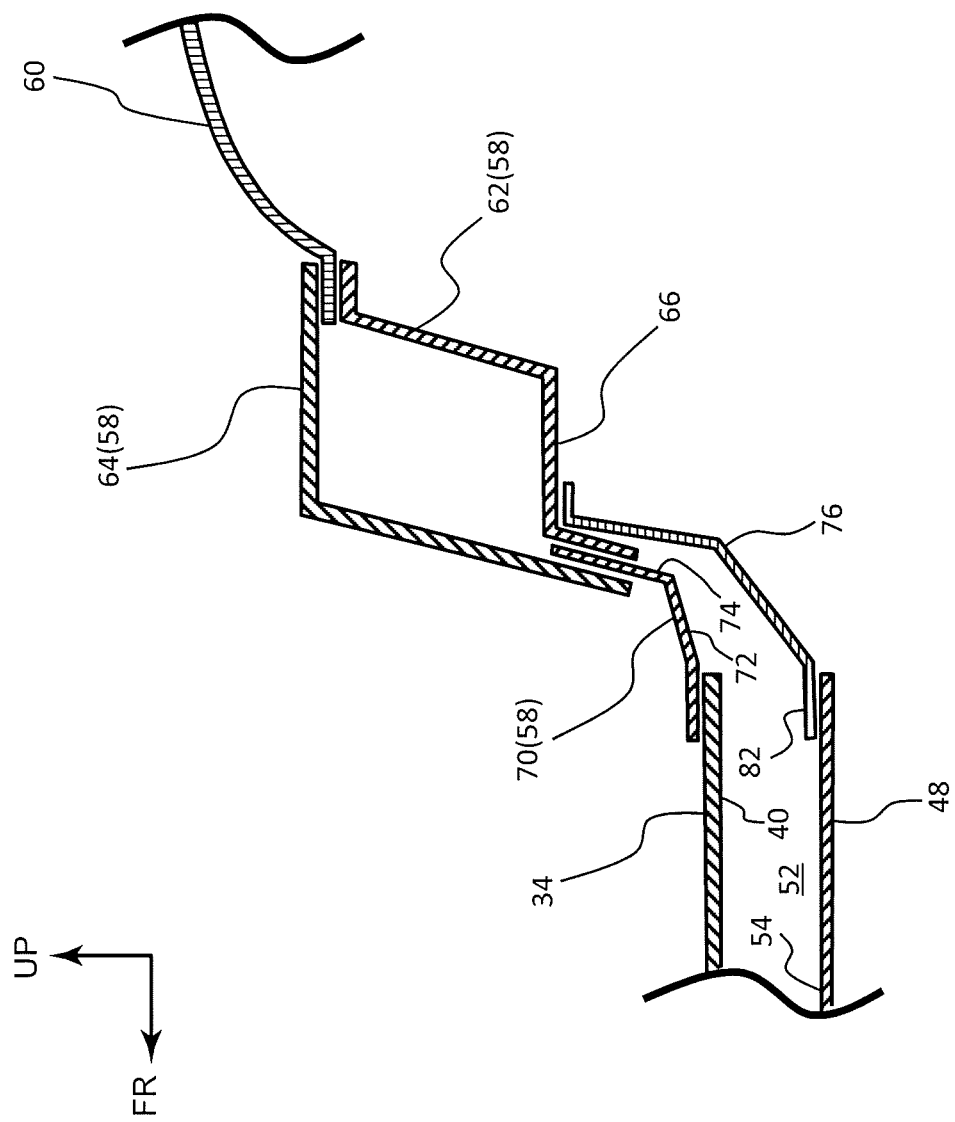
FIG. 6 is a cross section taken along line VI-VI in FIG. 2, viewed from a side of the vehicle.

As shown in FIGS. 4 to 6, a floor cross member 58 extends along the transverse axis of the vehicle and is connected to the rear edges of the left floor panel 32 and the right floor panel 34. It should be noted that a protector 92 described below is omitted in FIG. 5. Although, according to the present embodiment, the floor cross member 58 is connected to the right and left rocker panels 24 from the transversely inner sides of the vehicle by welding or other means, the floor cross member 58 may be connected to rear side members (not shown) or other elements of the body frame of the vehicle 10 at transversely outer sides of the vehicle at the rear. The floor cross member 58 is disposed between the floor panel 22 (the tunnel panel 30, the left floor panel 32, and the right floor panel 34) and a rear floor panel 60 of a floor at the rear of the passenger compartment or a luggage compartment. The transverse center of the floor cross member 58 is positioned around the rear end of the floor tunnel 28.

The floor cross member 58 includes a lower body portion 62 and an upper body portion 64, both of which extend along the transverse axis of the vehicle and have a substantially L-shaped cross section (refer to FIG. 6). The floor cross member 58 has, for example, a rectangular closed cross section when viewed from a side of the vehicle with the lower body portion 62 and the upper body portion 64 vertically coupled to each other such that the lower body portion 62 is placed under the opposing upper body portion 64. The lower body portion 62 of the floor cross member 58 includes an underside 66 that faces downward. A lower flange portion 68 is disposed to extend downward from the front edge of the underside 66. As shown in FIGS. 4 and 5, the lower body portion 62 is positioned higher and has a shorter height (in a vertical external dimension) around the transverse center than at both ends. An upper edge of a rear end of the tunnel panel 30 described above is secured to the lower body portion 62 by welding or other means.

According to the present embodiment, the floor cross member 58 further includes a connection panel 70 that is connected to the lower flange portion 68 and the left floor panel 32 or the right floor panel 34. The connection panel 70 has a substantially L-shaped cross section (refer to FIG. 6) when viewed from a side of the vehicle and includes a bottom surface 72 facing downwards and a rear surface 74 facing the rear of the vehicle. In other words, according to the present embodiment, the bottom surface 72 and the rear surface 74 of the connection panel 70 respectively serve as the bottom surface and the rear surface of the floor cross member 58. The lower flange portion 68 of the lower body portion 62 is connected to the rear surface 74 of the connection panel 70 by welding or other means. The rear surface 74 of the connection panel 70 is connected to the rear edges of the left floor panel 32 and the right floor panel 34 by welding or other means. The connection panel 70 and the lower body portion 62 or the upper body portion 64 may be integrally formed from a single panel.

Rear End Bracket

Figure 7:
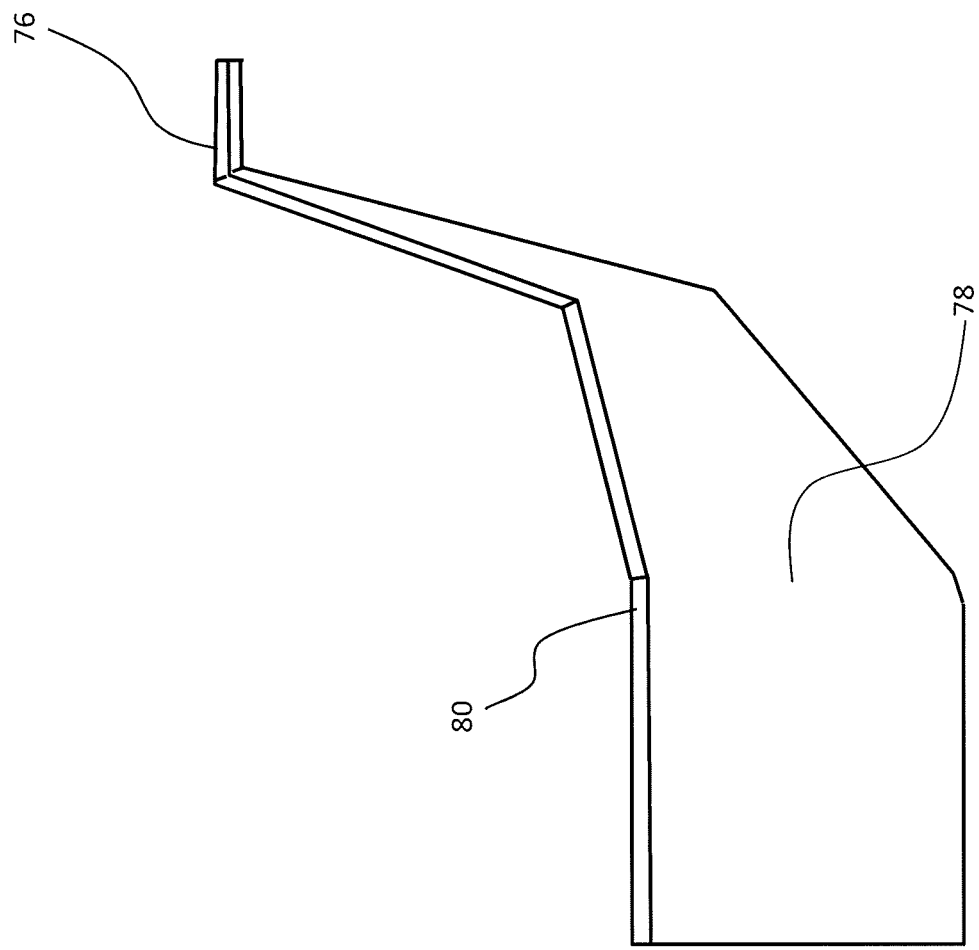
FIG. 7 is a side view of a rear end bracket according to the first embodiment of the present disclosure.

As shown in FIGS. 4 to 6, right and left rear brackets 76 are connected to the rear ends of the right and left under reinforcements 48. Each of the right and left rear brackets 76 has a substantially L-shaped cross section when viewed from a side of the vehicle (refer to FIG. 7). As shown in FIG. 4, each of the right and left rear brackets 76 includes a pair of wall portions 78 transversely spaced apart from each other. Right and left flanges 80 respectively extend from upper edges of the right and left wall portions 78. The right and left flanges 80 are connected on the bottom surface 72 of the connection panel 70 that serves as the bottom surface of the floor cross member 58 to form a closed cross section between each of the right and left rear brackets 76 and the connection panel 70, when viewed from the front or rear of the vehicle.

The right and left flanges 80 of each of the right and left rear brackets 76 are connected to the rear surface 74 of the connection panel 70 (the rear surface of the floor cross member 58) and the lower flange portion 68 of the lower body portion 62 by welding or other means. As shown in FIGS. 5 and 6, in the present embodiment, rear ends of the right and left flanges 80 are connected to the underside 66 of the lower body portion 62 of the floor cross member 58 by welding or other means. According to the present embodiment, bottom surfaces 82 of the right and left rear brackets 76 are vertically overlapped with and welded to bottom surfaces 54 of the right and left outer closed cross sectional portions 52, respectively. The right and left flanges 80 of the right and left rear brackets 76 are vertically overlapped with and welded to the right and left flange portions 50 of the right and left under reinforcements 48. The right and left wall portions 78 of each of the right and left rear brackets 76 may be welded to right or left wall portions 55 of the right or left outer closed cross sectional portion 52 from an inner side.

Hydrogen Tank

As shown in FIGS. 2 and 3, a first hydrogen tank 84 is disposed in and under the floor tunnel 28 such that at least an upper portion of the first hydrogen tank 84 is enclosed by the floor tunnel 28. The first hydrogen tank 84 is disposed along the longitudinal axis of the vehicle. The first hydrogen tank 84 includes a cylindrical body portion 86 at a longitudinal center position. At both ends of the body portion 86 of the first hydrogen tank 84, dome portions 88 having a semi-cylindrical shape when viewed from the top or bottom of the vehicle are formed. The body portion 86 may have a "substantially" cylindrical shape and the dome portions 88 may have a "substantially" semi-cylindrical dome shape. It should be noted that the protector 92 described below is omitted in FIG. 3.

Figure 8:
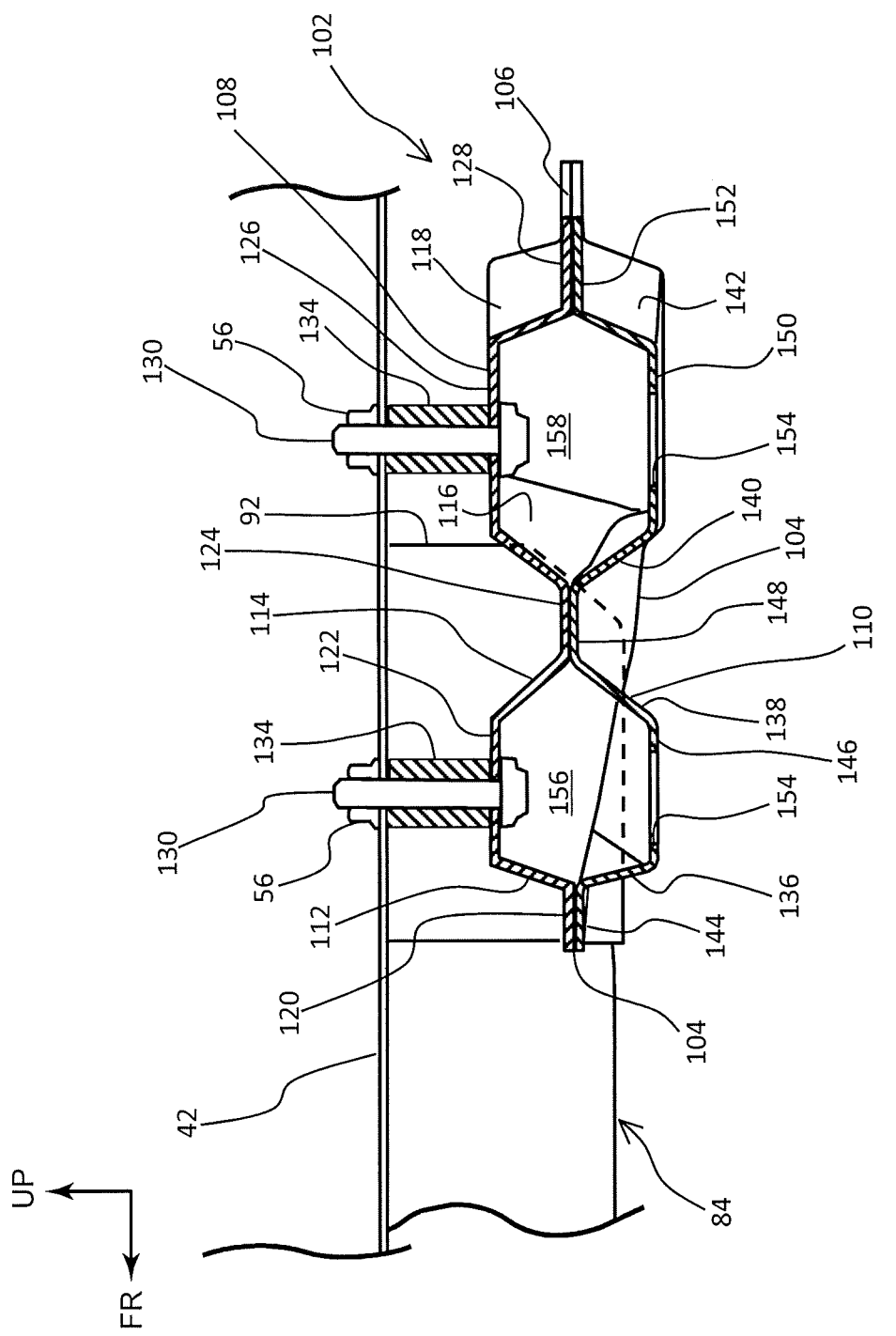
FIG. 8 is a cross section taken along line VIII-VIII in FIG. 2, viewed from a side of the vehicle.
Figure 9:
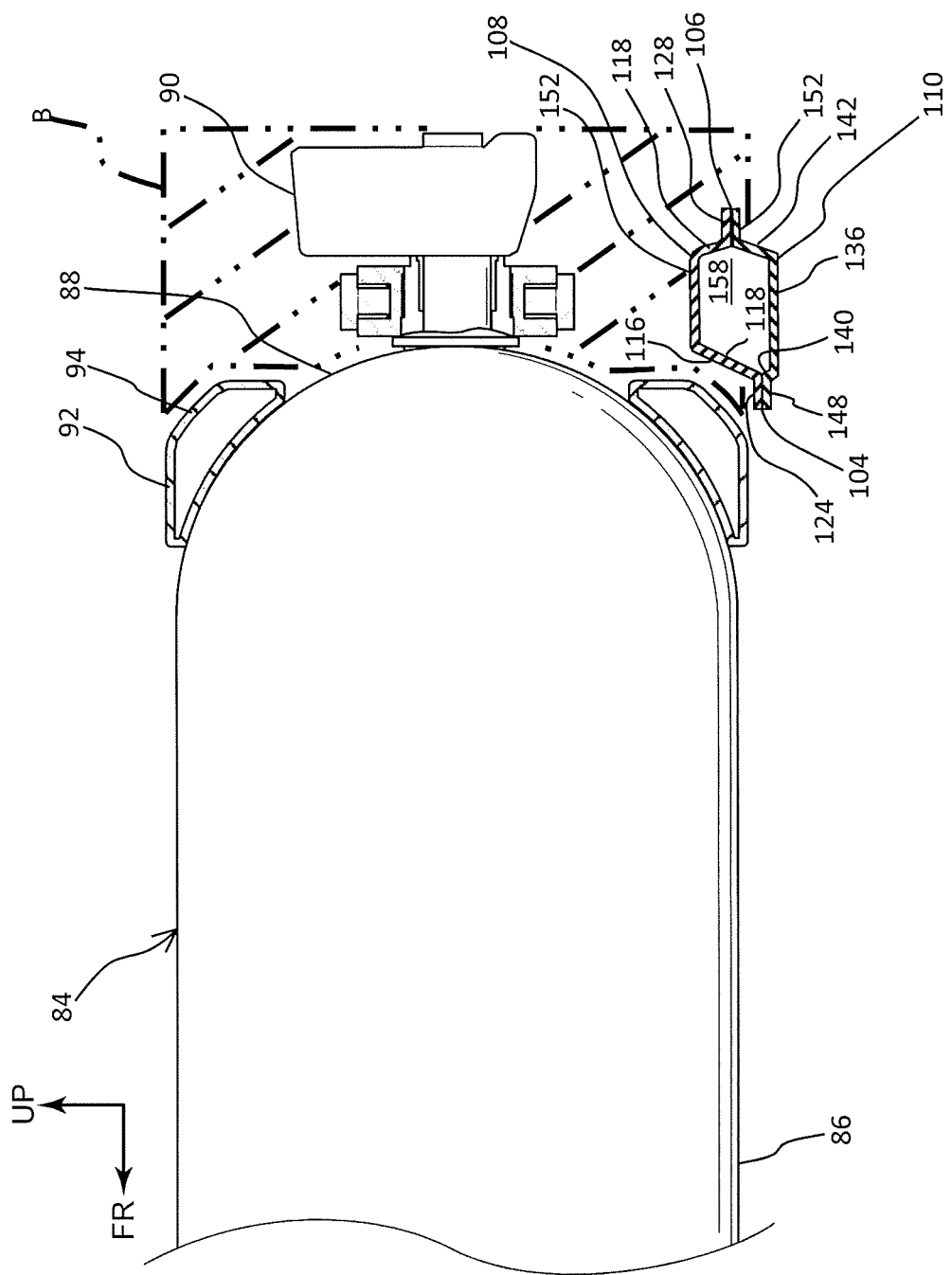
FIG. 9 is a cross section taken along line IX-IX in FIG. 2, viewed from a side of the vehicle.

The first hydrogen tank 84 includes a valve portion 90 that protrudes from the dome portion 88 on one side (first side) towards the opposite direction from the body portion 86 (towards the rear of the vehicle in the present embodiment). As shown in FIGS. 2, 4, 8, and 9, the annular protector 92 is coupled on an outer surface of the dome portion 88 as a portion of the first hydrogen tank 84. Although the protector 92 may be made from, for example, resin, the protector 92 may also be made from metal. As shown in FIG. 9, the protector 92 includes a chamfered edge 94 that is formed circumferentially around the protector 92. The outer diameter of the protector 92 may be equal to the outer diameter of the body portion 86, or slightly larger.

The valve portion 90 is connected to a tube (not shown) for supplying hydrogen to a fuel cell stack (not shown). The valve portion 90 includes a regulating valve (not shown) for regulating the amount of hydrogen flowing into and out from the first hydrogen tank 84, and a check valve (not shown) for holding hydrogen in a gas state in the first hydrogen tank 84. As shown in FIG. 2, the valve portion 90 is disposed between the rear end portions of the right and left under reinforcements 48 described above.

A transversely-oriented second hydrogen tank 96 is disposed at the rear of the first hydrogen tank 84. Further, a transversely-oriented third hydrogen tank 98 is disposed at rear of the second hydrogen tank 96. The above described rear floor panel 60 may include two or more concave portions 100 that protrude upward and are formed along the transverse axis of the vehicle. The second hydrogen tank 96 and the third hydrogen tank 98 are disposed under the rear floor panel 60 such that the upper portions of the second hydrogen tank 96 and the third hydrogen tank 98 are enclosed in the concave portions 100 of the rear floor panel 60. The number of hydrogen tanks is not limited to a specific number.

Brace Position

As shown in FIG. 2, a brace 102 as a reinforcing member is disposed below the floor tunnel 28 and secured to the right and left inner closed cross sectional portions 42 that serve as transversely outer side portions of the floor tunnel 28. The brace 102 is positioned to be at least partially overlapped with the dome portions 88 when viewed from the front or rear of the vehicle (refer to FIGS. 3, 4, and 10). The brace 102 may be secured not to the inner closed cross sectional portions 42 but directly to the lower surface 38 of the left floor panel 32 and the lower surface 40 of the right floor panel 34 serving as the transversely outer side portions of the floor tunnel 28.

FIGS. 2 and 9 include a shaded region B which represents a conceptual area where the brace 102 overlaps the body portion 86 when viewed from the front or rear of the vehicle and also with the dome portions 88 or the valve portion 90 when viewed from the top or bottom of the vehicle. In the present embodiment, the brace 102 is positioned to at least partially overlap the body portion 86 when viewed from the front or rear of the vehicle and the dome portions 88 or the valve portion 90 when viewed from the top or bottom of the vehicle (refer to FIGS. 2, 3, 4, and 10). The brace 102 is positioned to be at least partially inside the region B. The brace 102 may also be positioned, for example, above the valve portion 90. The brace 102 may be positioned to at least partially overlap the body portion 86 when viewed from the front or rear of the vehicle, and the dome portions 88 or the valve portion 90 when viewed from the top or bottom of the vehicle.

Figure 10:
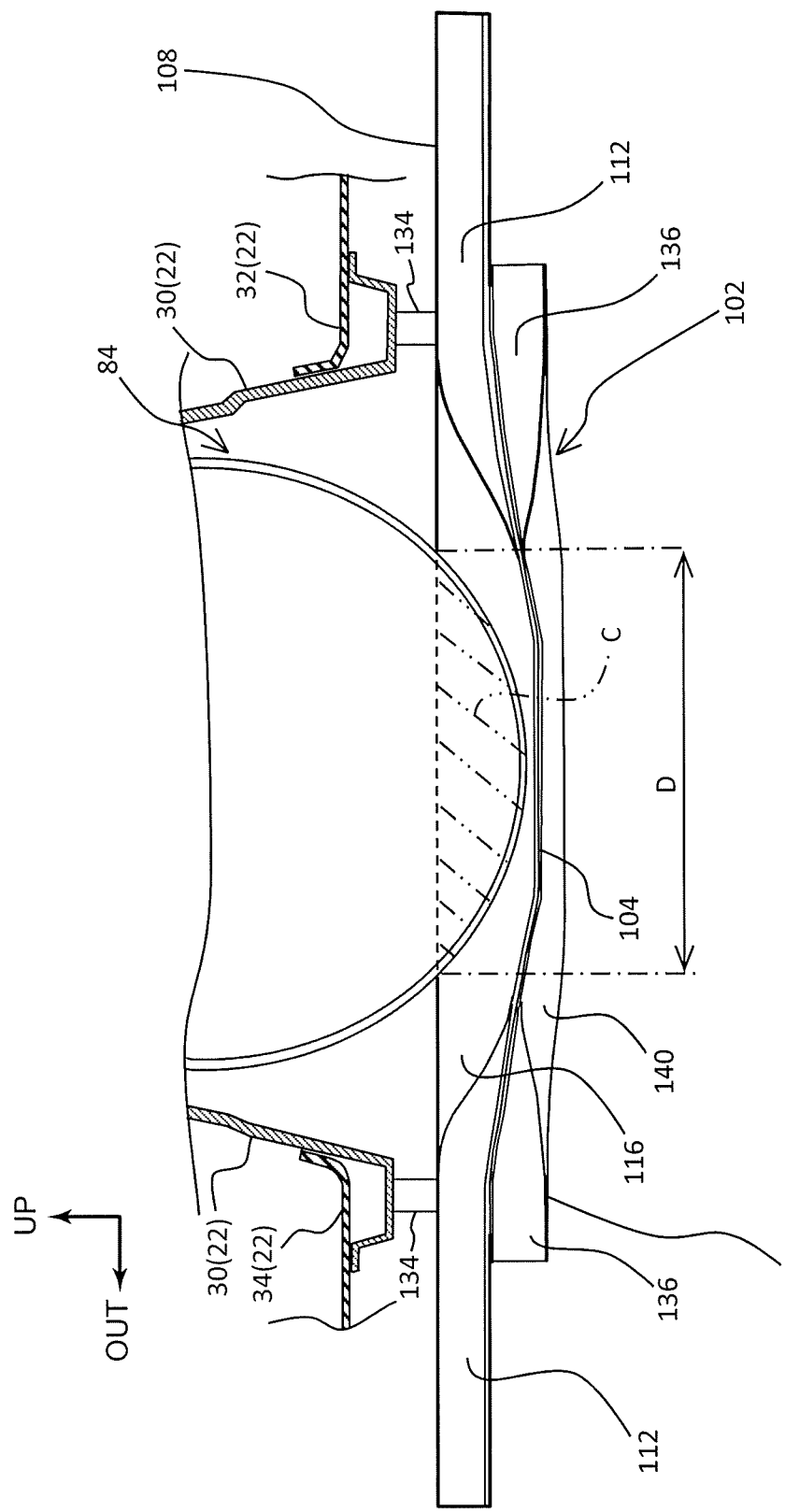
FIG. 10 is a cross section taken along line X-X in FIG. 2, viewed from the front of the vehicle.
Figure 11:
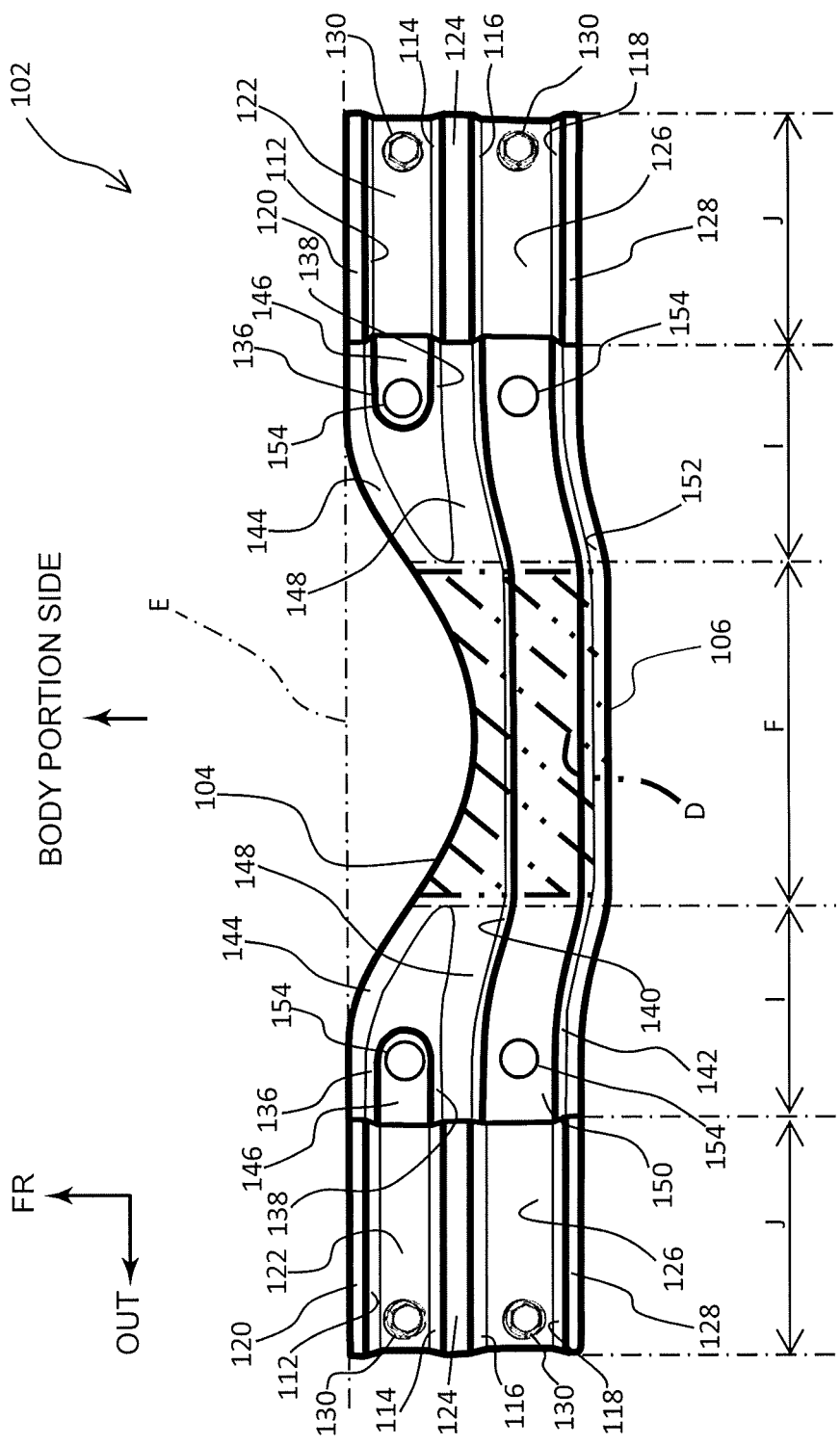
FIG. 11 is a bottom view showing an enlarged view of a brace according to the first embodiment of the present disclosure.

Shaded regions C in FIGS. 4 and 10 represent areas where the brace 102 overlaps with the dome portions 88 when viewed from the front or rear of the vehicle. A section D indicated with the two leader lines is a transverse section where the brace 102 overlaps the dome portions 88 when viewed from the front or rear of the vehicle. The section where the brace 102 overlaps the dome portions 88 when viewed from the front or rear of the vehicle represents a transversely inner section between the transversely outer sides of the shaded region C when viewed from the front or rear of the vehicle. FIG. 11 shows a shaded region D that is a transverse section corresponding to the section D shown in FIGS. 4 and 10. In these drawings, the region D represents the same transverse section in which the brace 102 overlaps the dome portions 88 when viewed from the front or rear of the vehicle.

A straight line E shown in FIG. 11 shows the longitudinal position (along the longitudinal axis of the first hydrogen tank 84) of edges at both ends of the brace 102 on the body portion 86 side. As shown in FIG. 11, the brace 102 is curved in a portion overlapping the dome portions 88 when viewed from the front or rear of the vehicle such that the curved portion curves away from the body portion 86 in comparison with both ends of the brace 102. The portion of the brace 102 that overlaps the dome portions 88 when viewed from the front or rear of the vehicle is positioned around the transverse center of the brace 102. The brace 102 has a shape that includes a notch around the transverse center. In other words, the ends of the brace 102 are both positioned on the body portion 86 side in comparison with the portion overlapping the dome portion 88 when viewed from the front or rear of the vehicle. As shown in FIG. 8, the brace 102 according to the present embodiment overlaps the first hydrogen tank 84 also when viewed from a side of the vehicle. Specifically, the brace 102 according to the present embodiment overlaps the protector 92 and the dome portions 88 of the first hydrogen tank 84 also when viewed from a side of the vehicle.

As shown in FIG. 10, the edge 104 of the brace 102 on the body portion 86 side is curved downward in comparison with both ends of the brace 102 at least partially in the transverse section D where the brace 102 overlaps the dome portions 88 when viewed from the front or rear of the vehicle. It should be noted that the curve is not limited to a curve with a constantly changing curvature. The curve may be a bend. In the present embodiment, the body portion 86 side indicates the front of the vehicle. In the present embodiment, the transverse edge of the brace 102 on the body portion 86 side curves both downwardly and horizontally to be away from the body portion 86 in comparison with the transverse edges at both ends of the brace 102 at least partially in the transverse section where the brace 102 overlaps the dome portions 88 when viewed from the front or rear of the vehicle.

According to the present embodiment, the edge 104 of the brace 102 on the body portion 86 side is the front edge of a front flange portion 120 of the upper brace 108 and the front edge of a front flange portion 144 of a lower brace 110, both of which are described below. As shown in FIG. 4, in the transverse section D overlapping the dome portions 88 when viewed from the front or rear of the vehicle, the edge 104 of the brace 102 on the body portion 86 side has substantially the same height as at both ends such that the edge 104 substantially linearly extends along the transverse axis of the vehicle, when viewed from the front or rear of the vehicle. According to the present embodiment, an edge 106 of the brace 102 on the opposite side from the body portion 86 side is the rear edge of a rear flange portion 128 of the upper brace 108 and the rear edge of a rear flange portion 152 of the lower brace 110, both of which are described below.

Brace Shape

The brace 102 includes the upper brace 108 as a first reinforcing element disposed at the top, and the lower brace 110 as a second reinforcing element being aligned with and disposed under the first reinforcing element along the transverse axis of the vehicle such that the upper brace 108 and lower brace 110 are coupled vertically together. Although the upper brace 108 and the lower brace 110 may be formed by pressing a steel sheet, the forming method is not limited to this example. The upper brace 108 and the lower brace 110 may be formed by extruding aluminum alloy.

Upper Brace

Regarding the shape of the upper brace 108, the shapes of transversely outer side portions are described first, and then, the shape at a transversely center portion. As shown in FIG. 8, each of the transversely outer end portions of the upper brace 108 has a cross sectional shape of two hats arranged in line along the longitudinal axis of the vehicle, with the openings facing downward, when viewed from a side of the vehicle. In other words, each of the transversely outer end portions of the upper brace 108 has a substantially inverted "W" shape, when viewed from a side of the vehicle.

More specifically, as shown in FIG. 8, each of the transversely outer end portions of the upper brace 108 has a cross section that includes two pairs of vertical wall portions extending substantially along the vertical axis of the vehicle, when viewed from a side of the vehicle. The four walls are a first vertical wall portion 112, a second vertical wall portion 114, a third vertical wall portion 116, and a fourth vertical wall portion 118, in this order from the front to the rear of the vehicle. The front flange portion 120 extends forward from the lower edge of the first vertical wall portion 112. The upper edges of the first vertical wall portion 112 and the second vertical wall portion 114 are connected to each other via a front top portion 122 (except for outer through holes and inner through holes described below; this note also applies to description below). The lower edges of the second vertical wall portion 114 and the third vertical wall portion 116 are connected to each other via a center flange portion 124. The upper edges of the third vertical wall portion 116 and the fourth vertical wall portion 118 are connected to each other via a rear top portion 126. The rear flange portion 128 extends rearward from the lower edge of the fourth vertical wall portion 118.

The upper brace 108 includes two pairs of outer through holes, one pair on the front top portions 122 and the other pair on the rear top portion 126 at each of the transversely outer end portions. The two through holes of each pair are arranged in line along the longitudinal axis of the vehicle. In other words, a total of four outer through holes are formed on the transversely outer end portions of the upper brace 108. The upper brace 108 also includes inner through holes at both of the transversely outer end portions. The inner through holes are disposed on the inner side of the outer through holes with space therebetween in the front top portions 122 and the rear top portion 126 of the upper brace 108. Specifically, on the inner side of the outer through holes of the upper brace 108, a total of four inner through holes are disposed, two at each of the transversely outer end portions. In summary, the upper brace 108 includes four through holes on the front top portions 122 and another four through holes on the rear top portion 126.

The upper brace 108 is secured to the outer closed cross sectional portions 52 by screw joint with bolts 130 and the above described weld nuts 56. The bolts 130 are inserted through the four outer through holes of the upper brace 108, two arranged in line along the longitudinal axis of the vehicle on each of the right and left, and the corresponding four through holes (described above) of the outer closed cross sectional portions 52, two arranged in line along the longitudinal axis of the vehicle on each of the right and left. The upper brace 108 may be secured to the outer closed cross sectional portions 52 not by the screw joint but by welding or other means. The upper brace 108 is also secured to the inner closed cross sectional portions 42 (transversely outer side portions of the tunnel panel 30) by screw joint with the bolts 132 and the weld nuts 56. The bolts 132 are inserted through the four inner through holes of the upper brace 108, two arranged in line along the longitudinal axis of the vehicle on each of the right and left, and the corresponding four through holes (described above) of the inner closed cross sectional portions 42, two arranged in line along the longitudinal axis of the vehicle on each of the right and left.

When the floor panel 22 is formed from a single panel, the reinforcing members may be separately provided such that each of the reinforcing member extends along the longitudinal axis of the vehicle and be attached to the floor panel 22 or the floor tunnel 28. The reinforcing member may have a hat-shaped cross section with the opening facing upwards, when viewed from the front or rear of the vehicle. In this case, the brace 102 may be secured to both of the transversely outer side portions of the floor tunnel 28 by securing the brace 102 to the reinforcing members.

The first to fourth vertical wall portions 112, 114, 116, and 118, the flange portions 120, 124, and 128, and the top portions 122 and 126 of each transversely outer end portion of the upper brace 108 extend at least from a position where the upper brace 108 is secured to the inner closed cross sectional portion 42 to a position where the upper brace 108 is secured to the outer closed cross sectional portions 52 on both sides.

In the embodiment described above, the right and left inner closed cross sectional portions 42 protrude downward from the floor panel 22 for a distance shorter than the right and left outer closed cross sectional portions 52. As shown in FIG. 3, steel collars 134 are disposed between the right and left inner closed cross sectional portions 42 and the front top portions 122 or the rear top portion 126 of the upper brace 108 such that the rear top portion 126 of the upper brace 108 substantially linearly extends along the transverse axis of the vehicle when viewed from the front or rear of the vehicle (refer to FIGS. 3, 4, and 10). The collars 134 are not limited to steel collars. The collars 134 may be made from, for example, resin or aluminum alloy.

Each of the right and left front top portions 122 extends only for a certain distance from a transversely outer side towards the center. The top edges of the first vertical wall portion 112 and the second vertical wall portion 114 are directly connected to each other at inner positions between the right and left inner through holes (at the positions where the bolts 132 are inserted). The first vertical wall portion 112 and the second vertical wall portion 114 curve rearward at inner positions between the right and left inner through holes such that the first vertical wall portion 112 and the second vertical wall portion 114 are positioned nearer at positions closer to the center. As shown in FIG. 10, the heights of the first vertical wall portion 112 and the second vertical wall portion 114 are also shortened at positions closer to the center (the upper edges of the first vertical wall portion 112 and the second vertical wall portion 114 are lowered at positions closer to the center from the transversely outer end portions). The first vertical wall portion 112 and the second vertical wall portion 114 have no height at a transversely center portion of the vehicle and the front flange portion 120 merges with the center flange portion 124.

As shown in FIG. 9, the upper brace 108 has a hat-shaped cross section with the opening side facing downwards around the lateral center of the vehicle, when viewed from a side of the vehicle. More specifically, as shown in FIG. 8, in the cross section viewed from a side of the vehicle, a pair of vertical wall potions (the third vertical wall portion 116 and the fourth vertical wall portion 118 described above) extend substantially along the vertical axis of the vehicle. The above described center flange portion 124 extends forwards from the lower edge of the third vertical wall portion 116. The upper edges of the third vertical wall portion 116 and the fourth vertical wall portion 118 are connected to each other via the above described rear top portion 126. The above described rear flange portion 128 extends rearward from the lower edge of the fourth vertical wall portion 118.

The third vertical wall portion 116 and the fourth vertical wall portion 118 of the upper brace 108 curve rearward at inner positions between the right and left inner through holes such that the third vertical wall portion 116 and the fourth vertical wall portion 118 are positioned further rearward at positions closer to the center. The third vertical wall portion 116 and the fourth vertical wall portion 118 both have heights all along the transverse axis of the vehicle. As shown in FIG. 3, the rear top portion 126 of the upper brace 108 (reinforcing element) that is secured to the right and left inner closed cross sectional portions 42 and the right and left outer closed cross sectional portions 52 substantially linearly extends along the transverse axis of the vehicle when viewed from the front or rear of the vehicle. In other words, the rear top portion 126 substantially linearly extends between the right and left joints where the brace 102 is secured to the right and left outer closed cross sectional portions 52, when viewed from the front or rear of the vehicle. As shown in FIG. 4, in the present embodiment, the fourth vertical wall portion 118 has a substantially constant height along the transverse axis of the vehicle. In other words, the fourth vertical wall portion 118 substantially linearly extends along the transverse axis of the vehicle between the right and left joints where the brace 102 is secured to the right and left outer closed cross sectional portions 52, when viewed from the front or rear of the vehicle.

As shown in FIG. 10, the height of the third vertical wall portion 116 becomes larger and the lower edge is positioned lower at positions closer to the center from the transversely outer sides of the vehicle. Accordingly, at the transverse center of the vehicle, the center flange portion 124 is positioned lower than the transversely outer end portions. As shown in FIG. 9, in the present embodiment, the center flange portion 124 is positioned lower than the lowest portion of the body portion 86 of the first hydrogen tank 84 around the transverse center of the brace 102, whereas the center flange portion 124 is positioned higher than the lowest portion of the body portion 86 of the first hydrogen tank 84 on transversely outer sides, as shown in FIG. 8. In other words, the transversely outer end portions of the center flange portion 124 overlap the body portion 86 of the first hydrogen tank 84 when viewed from a side of the vehicle.

Lower Brace

Similarly to the upper brace 108, the shapes of transversely outer portions are described first, and then, the shape of a transversely center portion of the lower brace 110. As shown in FIG. 8, each of the transversely outer end portions of the lower brace 110 has a cross sectional shape of two hats arranged in line along the longitudinal axis of the vehicle, with the openings facing upward, when viewed from a side of the vehicle. In other words, each of transversely outer end portions of the lower brace 110 has a substantially "W" shape, when viewed from a side of the vehicle.

More specifically, as shown in FIG. 8, each of the transversely outer end portions of the lower brace 110 has a cross section that includes two pairs of vertical wall portions extending substantially along the vertical axis of the vehicle, when viewed from a side of the vehicle. The four walls are a first vertical wall portion 136, a second vertical wall portion 138, a third vertical wall portion 140, and a fourth vertical wall portion 142, in this order from the front to the rear of the vehicle. A front flange portion 144 extends forward from the lower edge of the first vertical wall portion 136. The lower edges of the first vertical wall portion 136 and the second vertical wall portion 138 are connected to each other via a front bottom portion 146 (except for through holes 154 described below; this note also applies to the description below). The upper edges of the second vertical wall portion 138 and the third vertical wall portion 140 are connected to each other via a center flange portion 148. The lower edges of the third vertical wall portion 140 and the fourth vertical wall portion 142 are connected to each other via a rear bottom portion 150. The rear flange portion 152 extends rearward from the upper edge of the fourth vertical wall portion 142.

The lower brace 110 includes two pairs of through holes, one pair on the front bottom portion 146 and the other pair on the rear bottom portion 150 at each of the transversely outer end portions. The two through holes of each pair are arranged in line along the longitudinal axis of the vehicle. In other words, total of four through holes 154 are formed on the transversely outer end portions of the lower brace 110. Although not shown in detail in the drawings, the through holes 154 of the lower brace 110 are positioned to overlap the inner through holes of the upper brace 108 when viewed from the top or bottom of the vehicle. Each of the through holes 154 has an internal diameter larger than that of the inner through holes of the upper brace 108. In this way, the bolts 132 and a tool (not shown) can be inserted through the through holes 154 with the upper brace 108 and the lower brace 110 being vertically overlapped and coupled to each other to attach the bolts 132 that have been inserted through the inner through holes to the weld nuts 46 by screw joint.

As shown in FIGS. 10 and 11, each of the right and left front bottom portions 146 of the lower brace 110 extends for a certain distance from a transversely outer side towards the center. The lower edges of the first vertical wall portion 136 and the second vertical wall portion 138 are directly connected to each other at inner positions between the right and left through holes 154. The first vertical wall portion 136 and the second vertical wall portion 138 curve rearwards at inner positions between the right and left through holes 154 such that the first vertical wall portion 136 and the second vertical wall portion 138 are positioned rearer at positions closer to the center. As shown in FIG. 10, the heights of the first vertical wall portion 136 and the second vertical wall portion 138 are also shortened at positions closer to the center (the lower edges of the first vertical wall portion 136 and the second vertical wall portion 138 raises at positions closer to the center from the transversely outer end portions). The first vertical wall portion 136 and the second vertical wall portion 138 have no height at a transversely center portion of the vehicle and the front flange portion 144 merges with the center flange portion 148.

As shown in FIG. 9, the lower brace 110 has a hat-shaped cross section with the opening side facing upwards around the lateral center of the vehicle, when viewed from a side of the vehicle. More specifically, as shown in FIG. 9, in the cross section viewed from a side of the vehicle, a pair of vertical wall portions (the third vertical wall portion 140 and the fourth vertical wall portion 142 described above) extend substantially along the vertical axis of the vehicle. The above described center flange portion 148 extends forwards from the upper edge of the third vertical wall portion 140. The lower edges of the third vertical wall portion 140 and the fourth vertical wall portion 142 are connected to each other via the above described rear bottom portion 150. The above described rear flange portion 152 extends rearward from the upper edge of the fourth vertical wall portion 142.

The third vertical wall portion 140 and the fourth vertical wall portion 142 of the lower brace 110 curve rearward at inner positions between the right and left through holes 154 such that the third vertical wall portion 140 and the fourth vertical wall portion 142 are positioned rearer at positions closer to the center. The third vertical wall portion 140 and the fourth vertical wall portion 142 both have heights all along the transverse axis of the vehicle. As shown in FIG. 10, the height of the third vertical wall portion 140 is also shortened at positions closer to the center. The center flange portion 148 that extends forward from the upper edge of the third vertical wall portion 140 is positioned lower at the transverse center portion of the lower brace 110 than at the transverse outer end portions.

In the present embodiment, the center flange portion 124 of the upper brace 108 and the center flange portion 148 of the lower brace 110 are positioned lower than the lowest portion of the body portion 86 of the first hydrogen tank 84 around the transverse center portion of the brace 102 (refer to FIG. 9), whereas the transversely outer end portions of the center flange portion 148 are positioned higher than the lowest portion of the body portion 86 of the first hydrogen tank 84 (refer to FIG. 8). In other words, the transversely outer end portions of the center flange portion 148 are overlapped with the body portion 86 of the first hydrogen tank 84 when viewed from a side of the vehicle.

Relationship Between Upper Brace and Lower Brace

The lower brace 110 is aligned with the upper brace 108 along the transverse axis of the vehicle. As shown in FIG. 2, the upper brace 108 and the lower brace 110 are overlapped with each other around the transverse center and also with the dome portions 88 and the valve portion 90 of the first hydrogen tank 84 when viewed from the top or bottom of the vehicle. The upper brace 108 and the lower brace 110 may be partially overlapped with each other and with either one of the dome portions 88 and the valve portion 90 when viewed from the top or bottom of the vehicle.

The relationship between the upper brace 108 and the lower brace 110 is described further below. The front flange portion 120 of the upper brace 108 and the front flange portion 144 of the lower brace 110 are aligned to be vertically opposed each other and secured together by welding or other means. Similarly, the center flange portion 124 of the upper brace 108 and the center flange portion 148 of the lower brace 110 are aligned to be vertically opposed with each other and secured together by welding or other means. Similarly, the rear flange portion 128 of the upper brace 108 and the rear flange portion 152 of the lower brace 110 are aligned to be vertically opposed with each other and secured together by welding or other means. Although the front or rear edges of the opposing flanges of the upper brace 108 and the lower brace 110 are aligned in the present embodiment as shown in FIGS. 8 and 9, the edges may be unaligned.

The front top portion 122 of the upper brace 108 and the front bottom portion 146 of the lower brace 110 are vertically spaced apart and opposed with each other. Similarly, the rear top portion 126 of the upper brace 108 and the rear bottom portion 150 of the lower brace 110 are vertically spaced apart and opposed with each other. Further, because the first to fourth vertical wall portions 112, 114, 116, and 118 of the upper brace 108 and the first to fourth vertical wall portions 136, 138, 140, and 142 of the lower brace 110 are formed as described above, a front closed cross sectional portion 156 and a rear closed cross sectional portion 158 disposed on the rear of the front closed cross sectional portion 156 are formed between the upper brace 108 and the lower brace 110 as shown in FIG. 8. Each of the front closed cross sectional portion 156 and the rear closed cross sectional portion 158 has a closed cross section when viewed from a side of the vehicle.

The rear closed cross sectional portion 158 is formed along the transverse axis of the vehicle for the entire section where the upper brace 108 extends (excluding the points where the through holes 154 are formed). As shown in FIG. 2, the rear closed cross sectional portion 158 extends along the transverse axis of the vehicle including the area where the rear closed cross sectional portion 158 overlaps the dome portions 88 or the valve portion 90 when viewed from the top or bottom of the vehicle. As shown in FIGS. 2, 3, 4, and 10, the lower brace 110 is aligned with the upper brace 108 along the transverse axis of the vehicle to extend further outwardly than the right and left joints where the upper brace 108 is secured to both of the transversely outer side portions of the floor tunnel 28 (the right and left inner closed cross sectional portions 42), and the through holes 154 of the upper brace 108 are formed. Accordingly, the front closed cross sectional portion 156 and the rear closed cross sectional portion 158 extend further outward than the right and left joints where the upper brace 108 is secured to both of the transversely outer side portions of the floor tunnel 28. In other words, the front closed cross sectional portion 156 and the rear closed cross sectional portion 158 extend along the transverse axis of the vehicle across the positions where the upper brace 108 is secured to both of the transversely outer side portions of the floor tunnel 28 on both sides.

The first to fourth vertical wall portions 112, 114, 116, and 118, the front top portions 122, and the rear top portion 126 of the upper brace 108, and the first to fourth vertical wall portions 136, 138, 140, and 142, the front bottom portion 146, and the rear bottom portion 150 of the lower brace 110 extend further outward than the right and left joints where the upper brace 108 is secured to both of the transversely outer side portions of the floor tunnel 28 on both sides. Thus, even when the upper brace 108 includes inner through holes or the lower brace 110 includes through holes 154 as in the present embodiment, or when the inner through holes and the through holes 154 communicate to the transverse outer edge of the brace 102, the front closed cross sectional portion 156 and the rear closed cross sectional portion 158 can still be considered to extend further outward than the right and left joints where the upper brace 108 is secured to both of the transversely outer side portions of the floor tunnel 28 on both sides.

In FIG. 11, a transverse section F represents the section where the front closed cross sectional portion 156 is not formed while the rear closed cross sectional portion 158 is formed. In the present embodiment, the section F is formed around the transverse center of the brace 102 including the above described section D. FIG. 11 also shows sections I on both sides of the section F. The sections I represent the transverse sections where the front closed cross sectional portion 156 and the rear closed cross sectional portion 158 are both formed. Further, sections J on both sides of the sections I represent the transverse sections where the upper brace 108 alone extends.

Hydrogen Tank Holding Structure

As shown in FIG. 12A, the center of gravity G of the first hydrogen tank 84 is located around the longitudinal center of the first hydrogen tank 84. A neck mount 162 that is a holder for holding a neck portion 160 of the valve portion 90 of the first hydrogen tank 84 is provided on one side (the first side; that is, the rear side in the present embodiment) to the center of gravity G of the first hydrogen tank 84. As described below, the neck mount 162 is structured to release the first hydrogen tank 84 in response to a longitudinal relative movement between the floor tunnel 28 and the first hydrogen tank 84. In the present embodiment, the brace 102 is positioned on the first side (the rear side in the present embodiment) of the first hydrogen tank 84. The brace 102 is disposed to overlap the neck mount 162 when viewed from the top or bottom of the vehicle.

For example, as shown in FIGS. 13A to 13C, the neck mount 162 holding the first hydrogen tank 84 has a substantially L shape with a vertical portion 164 and a horizontal portion 166 when viewed from a side of the vehicle.

As shown in FIG. 13A, the vertical portion 164 includes a through hole 168, so that the valve portion 90 of the first hydrogen tank 84 is inserted through the through hole 168 and secured therein. The horizontal portion 166 extends to the front or rear of the vehicle (the rear in the present embodiment) from an edge of the vertical portion 164. (The horizontal portion 166 may extend along the longitudinal axis of the first hydrogen tank 84 in the opposite direction.) The horizontal portion 166 is secured to the floor tunnel 28, for example, by a bolt 170. Thus, a bolt hole 172 is formed in the horizontal portion 166. The bolt hole 172 is a long hole extending along the longitudinal axis of the vehicle. Specifically, the bolt hole 172 includes, at a rear portion, an enlarged diameter portion 174 through which the head of the bolt 170 can be inserted or uncoupled. In this way, the bolt hole 172 may have, for example, a key shape. The neck mount 162 may be secured with the bolts 170 to right and left brackets 163 that are secured inside the tunnel panel 30.

A tank band 176 is disposed on the other side (the second side, the front in the present embodiment) to the center of gravity G of the first hydrogen tank 84 from the neck mount 162. The tank band 176 is disposed around the entire circumference of the body portion 86 to hold the first hydrogen tank 84. The tank band 176 includes, for example, an upper hand 178 and a lower band 180.

The upper band 178 basically has a substantially semi-cylindrical shape having an inner peripheral surface that fits the outer peripheral surface of the upper half of the body portion 86. A flange portion 182 extends from each of both side edges of the upper band 178. Similarly, the lower band 180 basically has a substantially semi-cylindrical shape having an inner peripheral surface that fits the outer peripheral surface of the lower half of the body portion 86. A flange portion 184 extends from each of both side edges of the lower band 180. The flange portions 182 of the upper band 178 and the flange portions 184 of the lower band 180 are coupled together by screw joint with the body portion 86 of the first hydrogen tank 84 sandwiched from the top and the bottom by the upper band 178 and the lower band 180. The tank band 176 is secured at the bottom of the vehicle 10 by coupling, for example, the flange portions 182 of the upper band 178 or the flange portions 184 of the lower band 180 to the floor panel 22 (the left floor panel 32 and the right floor panel 34) by screw joint.

When the floor tunnel 28 and the first hydrogen tank 84 are longitudinally relatively moved due to collision loads applied from the front of the vehicle 10 to deform the floor tunnel 28 (specifically, the floor tunnel 28 is deformed to be shrunk along the longitudinal axis of the vehicle), the bolt 170 for securing the neck mount 162 is displaced towards the second side of the first hydrogen tank 84 (towards the tank band 176). The bolt 170 moves in the bolt hole 172 of the horizontal portion 166 of the neck mount 162 to place the head of the bolt 170 in the enlarged diameter portion 174 of the bolt hole 172 when viewed from the top or bottom of the vehicle.

Then, the head of the bolt 170 is uncoupled through the enlarged diameter portion 174 of the bolt hole 172 in the horizontal portion 166 of the neck mount 162, Because the center of gravity G of the first hydrogen tank 84 is on the first side (the rear side in the present embodiment) of the first hydrogen tank 84 from the tank band 176, shown in FIG. 12B, the first end (the rear side in the present embodiment) of the first hydrogen tank 84 is lowered and the first hydrogen tank 84 is tilted downward with the tank band 176 at the center.

Processes and Advantages of First Embodiment

Processes and advantages of the first embodiment of the present disclosure are described below.

The floor tunnel 28 of the vehicle 10 is opened downwards. When a steering wheel is turned or during driving, the vehicle 10 may rock to cause widening of the downward opening portion of the floor tunnel 28. Further, when providing an additional reinforcing member in the vehicle 10 that includes the first hydrogen tank 84 under the floor tunnel 28, it is desired to reduce the amount of downward protrusion of the additional reinforcing member below the body portion 86 of the first hydrogen tank 84. In the present embodiment, because the brace 102 is secured to both of the transversely outer side portions of the floor tunnel 28, a possible widening of the opening of the floor tunnel 28 during driving can be reduced, enhancing operational stability of the vehicle 10. Further, because the brace 102 is disposed to at least partially overlap the dome portions 88 when viewed from the front or rear of the vehicle, the amount of downward protrusion of the brace 102 below the body portion 86 of the first hydrogen tank 84 can also be reduced.

The brace 102 can be disposed in space around the dome portions 88 or the valve portion 90 because the brace 102 is positioned to at least partially overlap the body portion 86 when viewed from the front or rear of the vehicle and the dome portions 88 or the valve portion 90 when viewed from the top or bottom of the vehicle. In this way, the amount of downward production of the brace 102 below the body portion 86 of the first hydrogen tank 84 can be reduced. Further, when the bottom of the vehicle 10 hits an obstacle such as a stone or curbstone on a road, the brace 102 can inhibit impact from being transmitted to the dome portions 88 or the valve portion 90 from the bottom of the vehicle.

When the floor tunnel 28 is deformed due to collision loads applied to the vehicle 10 to cause a longitudinal relative movement between the floor tunnel 28 and the first hydrogen tank 84, the first hydrogen tank 84 is released from the neck mount 162 that holds the first hydrogen tank 84 on the first side. Then, one end of the first hydrogen tank 84 on the first side is tilted downward below the other end of the first hydrogen tank 84 on the second side. In this way, because the first hydrogen tank 84 can be inhibited from being compressed along the longitudinal axis in the floor tunnel 28, the load applied to the first hydrogen tank 84 can be reduced. Because the brace 102 is disposed on the first side of the first hydrogen tank 84 and at a position overlapped with the body portion 86 when viewed from the front or rear of the vehicle and also with the dome portions 88 or the valve portion 90 when viewed from the top or bottom of the vehicle, the brace 102 for supporting the dome portions 88 or the valve portion 90 can inhibit the dome portions 88 and the valve portion 90 from being strongly hit against the ground, the under cover, or other elements.

The brace 102 horizontally curves in the area where the brace 102 overlaps the dome portions 88 when viewed from the front or rear of the vehicle such that this portion protrudes to the opposite from the body portion 86 in comparison with the transversely outer end portions of the brace 102 on the right and left. The brace 102 also vertically curves at the edge on the side on the body portion 86 side such that the edge in a section where the brace 102 overlaps the dome portions 88 when viewed from the front or rear of the vehicle is at least partially positioned below the transversely outer end portions on the right and left. Because the brace 102 curves as described above, the brace 102 can be disposed in space around the dome portions 88 or the valve portion 90. In this way, the amount of downward protrusion of the brace 102 below the body portion 86 can be reduced in comparison with the brace 102 that is not curved. Further, because space is provided to inhibit the brace 102 from coming into contact with the dome portion 88 and the protector 92 of the first hydrogen tank 84, the amount of downward protrusion of the brace 102 below the body portion 86 can be reduced in comparison with the brace 102 that is not curved.

Further, because the brace 102 is secured to the right and left outer closed cross sectional portions 52 and the right and left inner closed cross sectional portions 42, rocking of the bottom of the vehicle can be reduced, enhancing operational stability of the vehicle 10. In other words, the rigidity of the bottom of the vehicle is improved. Even when a larger load is applied to one side of the floor tunnel 28 than to the other side, or when a torsional load is applied to the floor tunnel 28, because the brace 102 is secured to the right and left outer closed cross sectional portions 52 and the right and left inner closed cross sectional portions 42, operational stability of the vehicle 10 can be enhanced.

Further, because the brace 102 is secured to each of the right and left inner closed cross sectional portions 42 at two joints that are aligned in line along the longitudinal axis of the vehicle on each of the right and left inner closed cross sectional portions 42, the load applied to the joints can be efficiently dispersed to the inner closed cross sectional portions 42 in comparison with the brace 102 that is secured to each of the right and left inner closed cross sectional portions 42 at a single joint.

Similarly, because the brace 102 is secured to each of the right and left outer closed cross sectional portions 52 at two joints that are aligned in line along the longitudinal axis of the vehicle on each of the right and left outer closed cross sectional portions 52, the load applied to the joints can be efficiently dispersed to the outer closed cross sectional portions 52 in comparison with the brace 102 that is secured to each of the right and left outer closed cross sectional portions 52 at a single joint.

When rocking that may cause widening of the opening of the floor tunnel 28 occurs, a load is applied to the brace 102 along the transverse axis of the vehicle. Because the brace 102 according to the present embodiment substantially linearly extends along the transverse axis of the vehicle between the joints where the brace 102 is secured to the right and left outer closed cross sectional portions 52 when viewed from the front or back of the vehicle, the rigidity of the brace 102 against loads along the transverse axis of the vehicle is enhanced. In this way, widening of the opening of the floor tunnel 28 can be further reduced, enhancing operational stability of the vehicle 10.

In the present embodiment, because the floor cross member 58 and the right or left under reinforcements 48 are firmly secured together with the right and left rear brackets 76 and further because the brace 102 extending along the transverse axis of the vehicle is secured to the right and left outer closed cross sectional portions 52 and the right and left inner closed cross sectional portions 42, the rigidity of the floor tunnel 28 around the rear end is increased. In this way, widening of the opening of the floor tunnel 28 can be further reduced, enhancing operational stability of the vehicle 10.

In the present embodiment, the brace 102 includes the lower brace 110 in addition to the upper brace 108. The upper brace 108 and the lower brace 110 are at least partially overlapped with each other when viewed from the top of bottom of the vehicle, and also with the dome portions 88 or the valve portion 90, and impact from the bottom of the vehicle can be effectively inhibited from being transmitted to the dome portions 88 or the valve portion 90. Further, because the lower brace 110 is aligned with the upper brace 108 along the transverse axis of the vehicle, the rigidity of the brace 102 against transverse loads can be improved. In this way, widening of the opening of the floor tunnel 28 during driving can be inhibited, enhancing operational stability of the vehicle 10.

In the present embodiment, because the upper brace 108 and the lower brace 110 form the rear closed cross sectional portion 158 that extends along the transverse axis of the vehicle, widening of the opening of the floor tunnel 28 can be inhibited, enhancing operational stability of the vehicle 10. Because the rear closed cross sectional portion 158 extends along the transverse axis of the vehicle, including the areas where the rear closed cross sectional portion 158 overlaps the dome portions 88 or the valve portion 90 at least when viewed from the top or bottom of the vehicle, the rigidity of the reinforcing member can be enhanced against impact from the bottom of the vehicle, effectively reducing impact transmitted to the first hydrogen tank 84.

In the present embodiment, the front closed cross sectional portion 156 and the rear closed cross sectional portion 158 extend further outward from the right and left joints where the upper brace 108 is secured to both of the transversely outer side portions of the floor tunnel 28. In this way, the rigidity of the upper brace 108 around the joints can be improved, enhancing operational stability of the vehicle 10. Further, a torsional deformation of the brace 102 due to loads transmitted from around the joints of the upper brace 108 can be reduced. Impact from the bottom of the vehicle can be effectively inhibited from being transmitted to the first hydrogen tank 84 by efficiently dispersing the impact to the floor panel 22.

Second Embodiment

An underbody of the vehicle 10 according to a second embodiment is described below. The same reference numerals are assigned to the elements corresponding to those in the first embodiment. Detailed description (including advantages) of these corresponding elements is omitted. Embodiments subsequent to the second embodiment are described in the same manner below.

Figure 14:
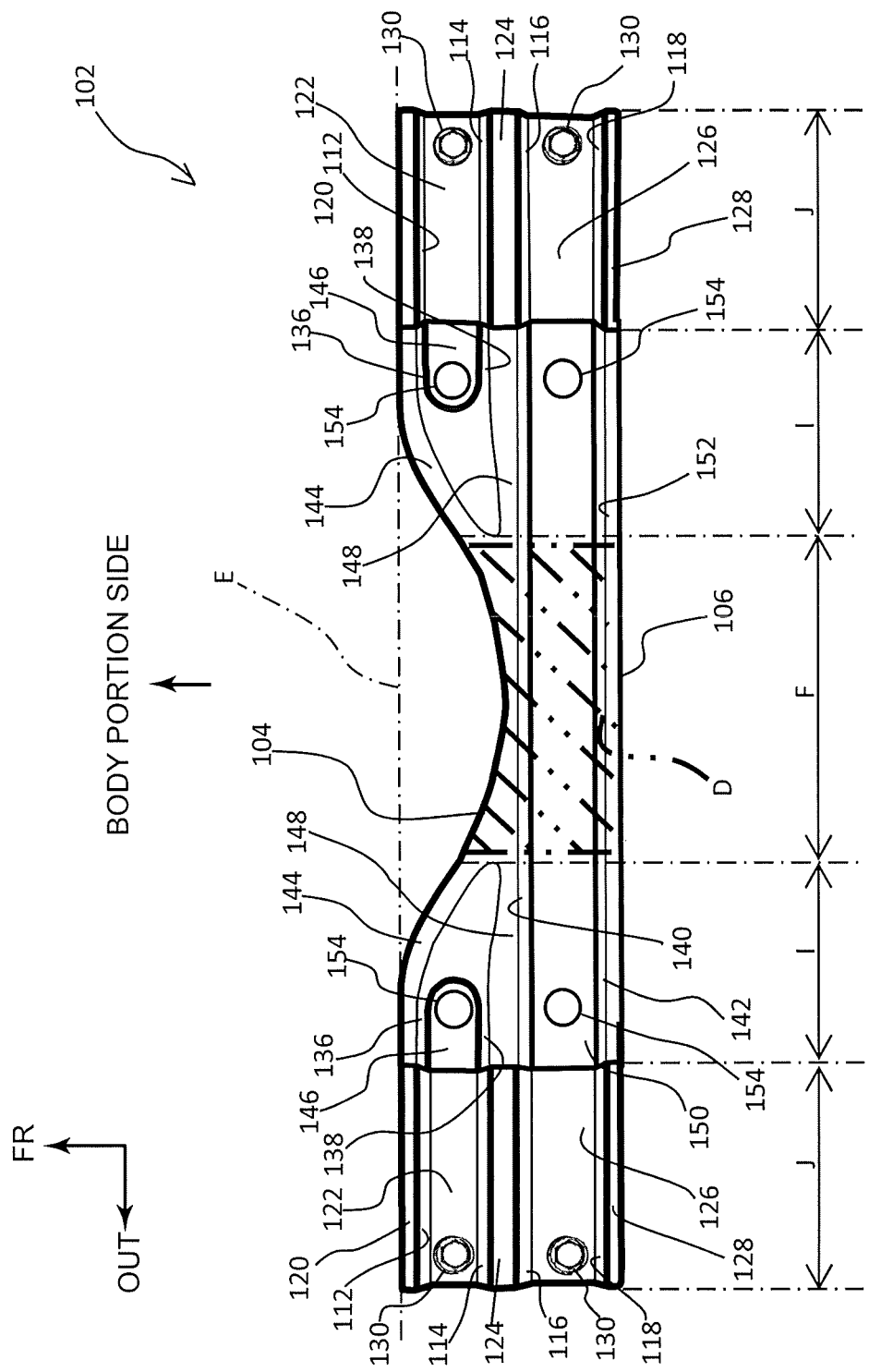
FIG. 14 is a bottom view showing an enlarged view of a brace according to a second embodiment of the present disclosure, corresponding to FIG. 11 in the first embodiment.

The underbody according to the second embodiment basically has a similar structure as the first embodiment. As shown in FIG. 14, the underbody according to the second embodiment is characterized by the rear closed cross sectional portion 158 that substantially linearly extends along the transverse axis of the vehicle when viewed from the top or rear of the vehicle. The rear closed cross sectional portion 158 is formed between the upper brace 108 and the lower brace 110 and has a closed cross section when viewed from a side of the vehicle.

Processes and Advantages of Second Embodiment

Processes and advantages of the second embodiment of the present disclosure are described below.

When rocking that may cause widening of the opening of the floor tunnel 28 occurs, a load along the transverse axis of the vehicle is applied to the brace 102. Because the rear closed cross sectional portion 158 of the brace 102 according to the present embodiment substantially linearly extends along the transverse axis of the vehicle when viewed from the top or bottom of the vehicle, the rigidity of the brace 102 against loads along the transverse axis of the vehicle is enhanced. In this way, widening of the opening of the floor tunnel 28 can be further inhibited, enhancing operational stability of the vehicle 10.

Third Embodiment

Although the underbody according to a third embodiment basically has a similar structure as the first embodiment, the underbody according to the third embodiment is characterized by two braces 102, each of which has a round rod shape. The underbody is further characterized by separately-provided right and left tunnel side reinforcements 188 that extend along the longitudinal axis of the vehicle on the transversely outer sides of the floor tunnel 28. The right and left tunnel side reinforcements 188 are attached to a lower surface 186 of the tunnel panel 30.

Figure 16:
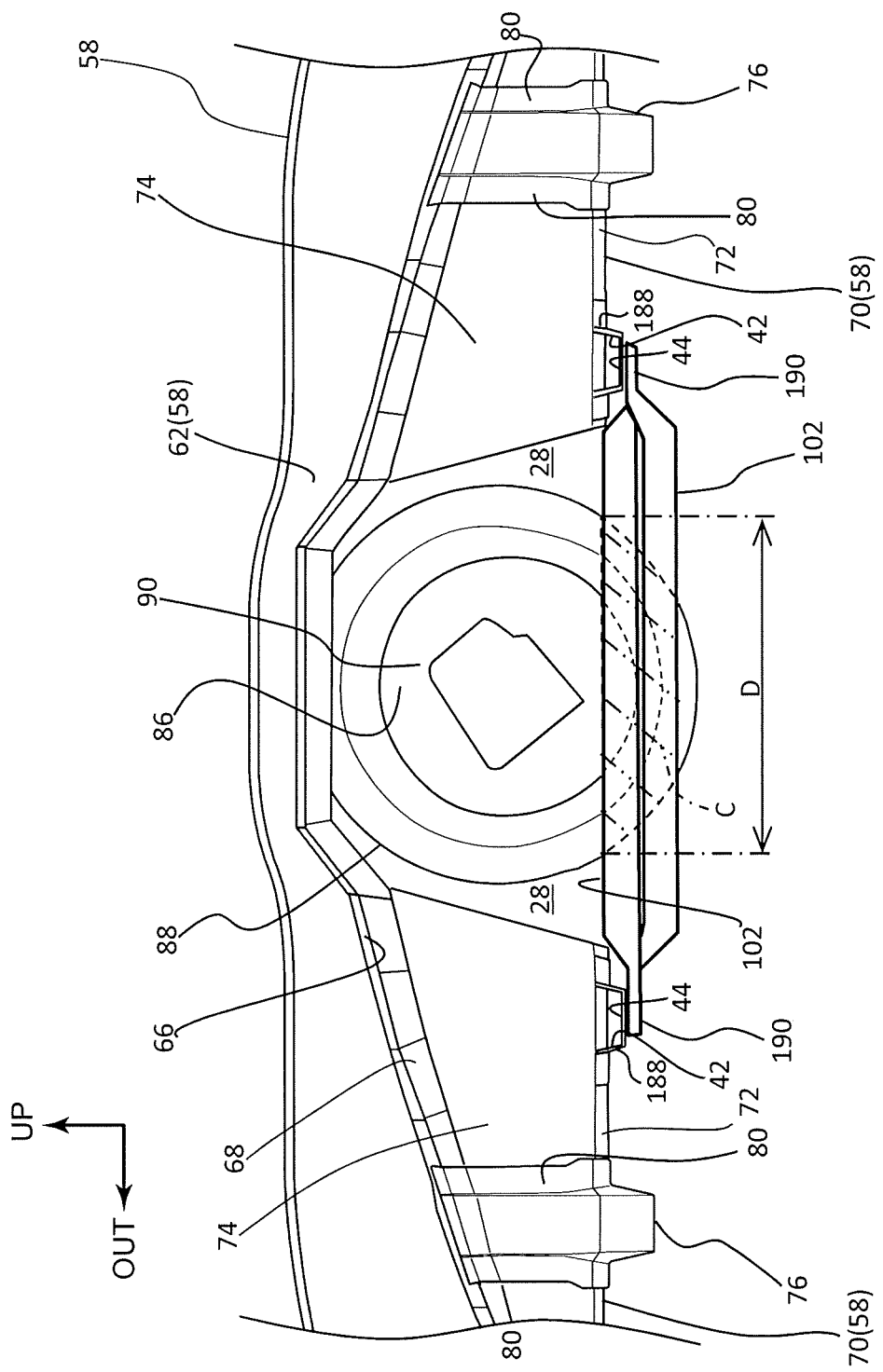
FIG. 16 is a rear view of a vehicle underbody according to the third embodiment of the present disclosure, corresponding to FIG. 4 in the first embodiment.
Figure 17:
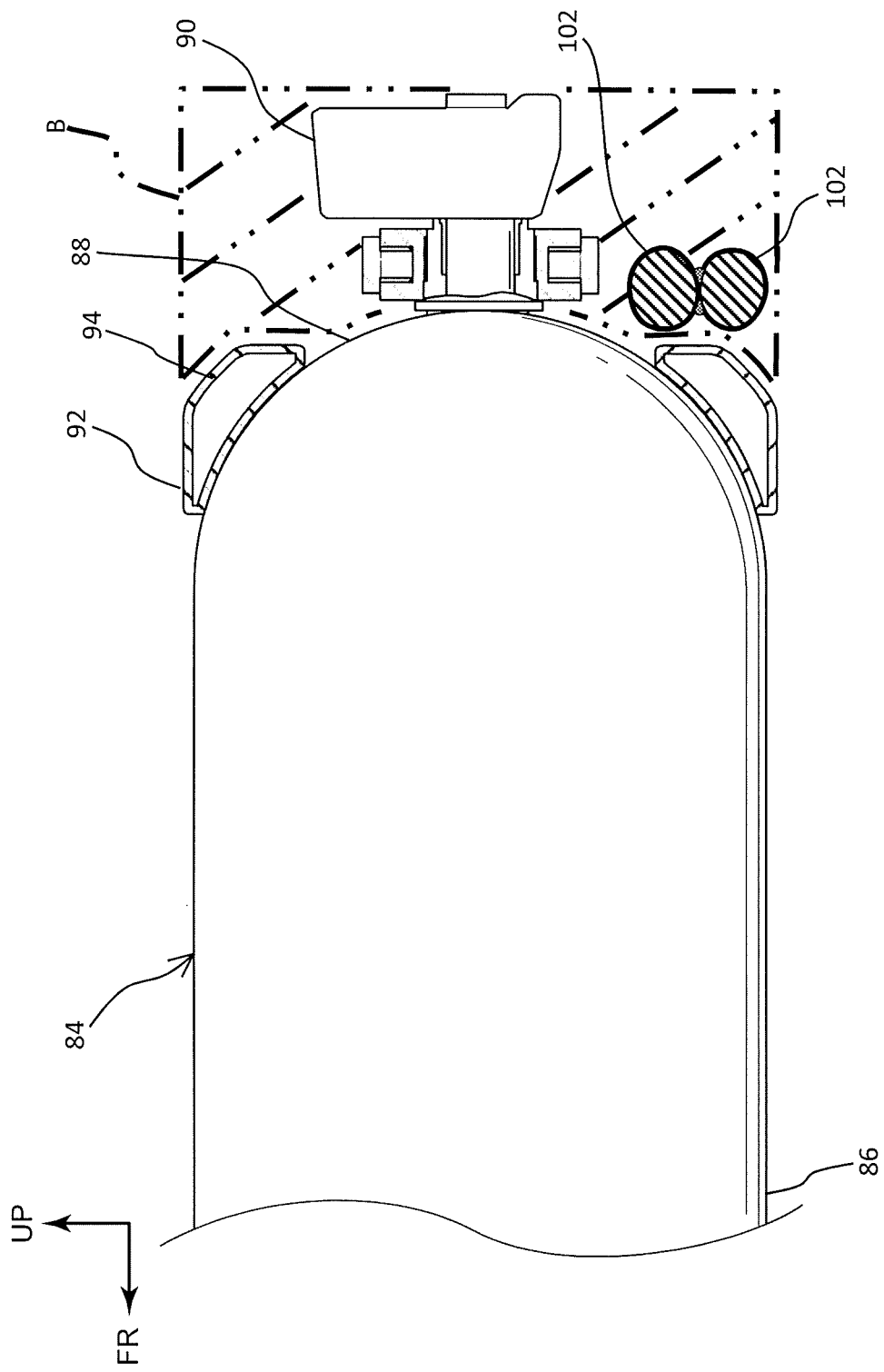
FIG. 17 is a cross section taken along line XVI-XVI in FIG. 15.

As shown in FIG. 16, each of the right and left tunnel side reinforcements 188 has a hat-shaped cross section with the opening side facing upwards, when viewed from the front or rear of the vehicle. The right and left tunnel side reinforcements 188 extend along the longitudinal axis of the vehicle next to the floor tunnel 28. With the tunnel panel 30, each of the right and left tunnel side reinforcements 188 forms the right or left inner closed cross sectional portion 42 when viewed from the front or rear of the vehicle. Each of the right and left inner closed cross sectional portions 42 has a closed cross section when viewed from the front or rear of the vehicle and serves as the transversely outer side portions of the floor tunnel 28. Each of the right and left tunnel side reinforcements 188 extends along the longitudinal axis of the vehicle on a transversely outer side of the floor tunnel 28. In a cross section viewed from the front or rear of the vehicle, each closed cross section is formed including the tunnel panel 30 and the right or left tunnel side reinforcement 188.

Figure 15:
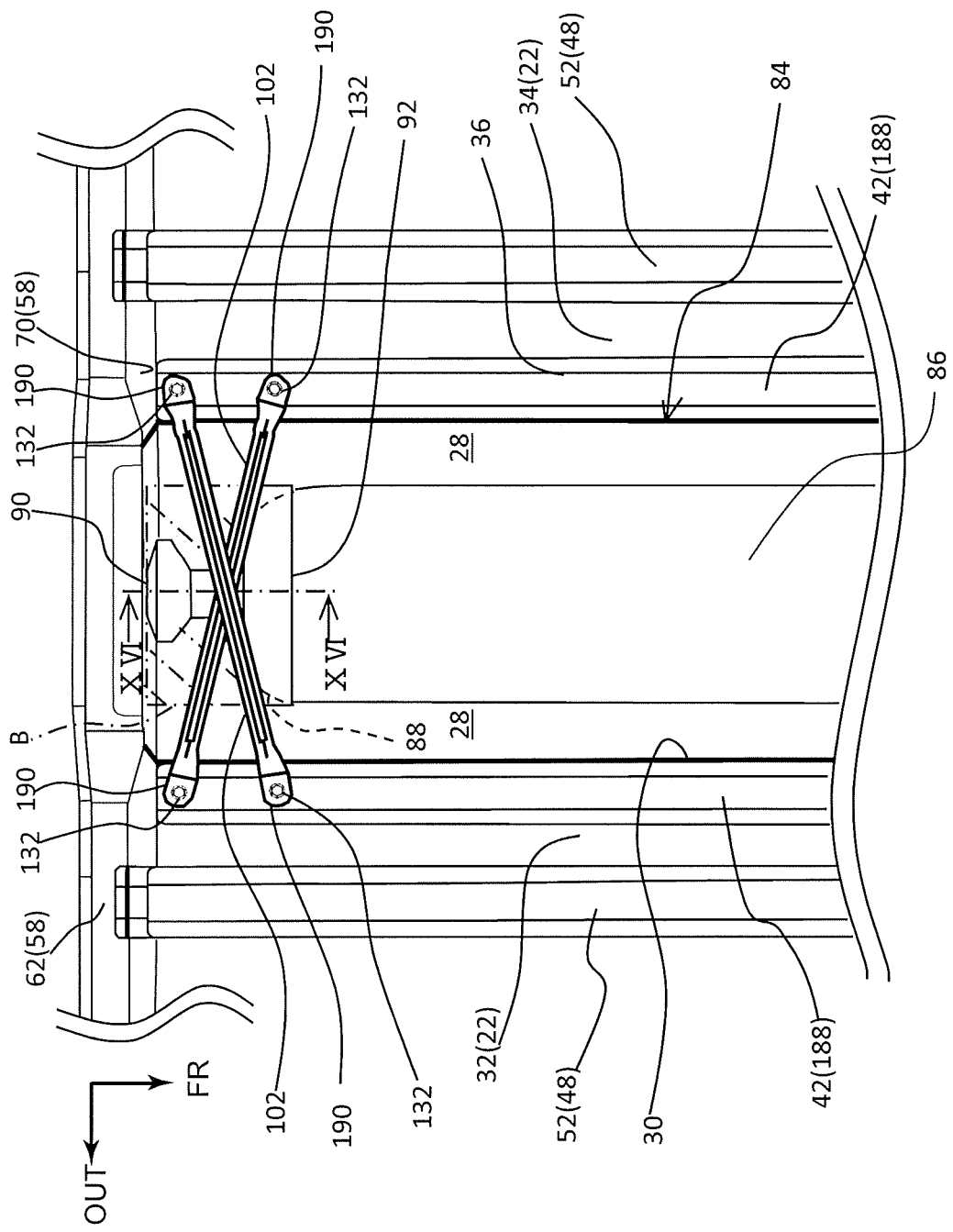
FIG. 15 is a bottom view of a vehicle underbody according to a third embodiment of the present disclosure, corresponding to FIG. 2 in the first embodiment.

As shown in FIG. 15, two braces 102, each having a round rod shape, are disposed to intersect with each other around the transverse center of the vehicle such that the two round rod shaped braces 102 at least partially overlap with each other and also with the dome portions 88 or the valve portion 90.

Each of the two round rod shaped braces 102 includes, on each end, a flange portion 190 having a through hole. The bolts 132 are inserted into these through holes and the corresponding through holes in the bottom surfaces 44 of the right and left inner closed cross sectional portions 42, similarly as the first embodiment. The two round rod shaped braces 102 are secured to the right and left inner closed cross sectional portions 42 by coupling the bolts 132 and the weld nuts 46 disposed in the right and left inner closed cross sectional portions 42 by screw joint, similarly as the first embodiment. The two round rod shaped braces 102 may be coupled to each other by welding or other means. In this way, the braces 102 are secured to both of the transversely outer side portions of the floor tunnel 28. Although the two round rod shaped braces 102 are secured to the right and left inner closed cross sectional portions 42 without collars therebetween as shown in FIG. 16 in the present embodiment, the two round rod shaped braces 102 and the right and left inner closed cross sectional portions 42 may be secured to each other via the collars 134, similarly as the first embodiment. The round rod shaped braces 102 may be solid or hollow.

Processes and Advantages of Third Embodiment

Processes and advantages of the third embodiment of the present disclosure are described below.

In the present embodiment, because the two round rod shaped braces 102 are at least partially overlapped with each other, and also with the dome portions 88 or the valve portion 90 when viewed from the top or bottom of the vehicle, impact from the bottom of the vehicle can be effectively inhibited from being transmitted to the dome portions 88 and the valve portion 90. The rigidity of the braces 102 can be enhanced by coupling the two round rod shaped braces 102 to each other by welding or other means.

In this way, the widening of the opening of the floor tunnel 28 during driving can be reduced, enhancing the operational stability of the vehicle 10.

Other Embodiments

Although the enlarged diameter portion 174 is provided in the first embodiment in the rear of the bolt hole 172 in the horizontal portion 166 of the neck mount 162 to enable the head of the bolt 170 to be uncoupled through the enlarged diameter portion 174 when the floor tunnel 28 is deformed due to collision loads applied from the front of the vehicle 10, the enlarged diameter portion 174 may be provided in the front of the bolt hole 172. In this case, the force of the tank band 176 to hold the first hydrogen tank 84 may be adjusted such that the bolt 170 is displaced in the bolt hole 172 of the horizontal portion 166 at the neck mount 162 when a compression force applied to the first hydrogen tank 84 from the front to the rear of the vehicle due to a load applied to the first hydrogen tank 84 from the front of the vehicle is higher than a friction force applied by the tank band 176 to the first hydrogen tank 84. An elastic element such as a coil spring may be inserted between the flange portions 182 and 184 to apply force to separate the upper band 178 and the lower band 180. Also in this case, the head of the bolt 170 can be uncoupled through the enlarged diameter portion 174 when the head of the bolt 170 is displaced into the enlarged diameter portion 174 of the bolt hole 172 when viewed from the top or bottom of the vehicle.

As shown in FIG. 13B, a notch continuous from the bolt hole 172 may be formed in the horizontal portion 166. As shown in FIG. 13C, a groove portion (that is, a break portion) may be formed in the vertical portion 164 in a manner that when a stress exceeding a predetermined strength is applied to the vertical portion 164 of the neck mount 162, the vertical portion 164 is broken. In summary, any configuration can be used as long as holding of the first hydrogen tank 84 can be released at one end when the floor tunnel 28 deforms to be compressed along the longitudinal axis of the vehicle and a load greater than a predetermined strength is applied to the neck mount 162 serving as a holder. In any case, the rigidity of the neck mount 162 may be adjusted so as to release the holding of the first hydrogen tank 84 by the neck mount 162 before the first hydrogen tank 84 comes into contact with the second hydrogen tank 96.

Although the tank is described as a hydrogen tank for storing hydrogen in the above embodiments, the tank is not limited to the hydrogen tank. The tank may be a gas tank or a tank for any other substances.

Although exemplary embodiments are described above, the present disclosure is not limited to those embodiments. A variety of combinations of the embodiments or modifications without departing from the scope of the present disclosure are obviously possible.

The understructure according to the above described embodiments can be considered from a different point of view. For example, an object to be achieved by the understructure according to the first embodiment or the second embodiment may also be considered to enhance operational stability of the vehicle by reducing rocking of the vehicle understructure when the steering wheel is turned or during driving.

When the object is considered in this way, the means for achieving the object becomes, for example, as follows.

"A vehicle understructure comprising:

right and left rocker panels extending along a longitudinal axis of a vehicle on both of transversely outer sides of the vehicle and forming a vehicle body frame;

a floor tunnel forming a transverse center portion of a floor panel between the right and left rocker panels, the floor tunnel extending along the longitudinal axis of the vehicle and being downwardly opened;

right and left inner closed cross sectional portions extending along the longitudinal axis of the vehicle on both transversely outer sides of the floor tunnel, each of the inner closed cross sectional portions forming a closed cross section with the floor panel when viewed from the front or rear of the vehicle;

right and left outer closed cross sectional portions extending along the longitudinal axis of the vehicle on transversely inner sides to the rocker panels and on transversely outer sides to the right and left inner closed cross sectional portions, each of the outer closed cross sectional portions forming a closed cross section with the floor panel when viewed from the front or rear of the vehicle; and a reinforcing member secured to the right and left inner closed cross sectional portions and the right and left outer closed cross sectional portions."

According to the above structure, because the reinforcing member is secured to the right and left outer closed cross sectional portions and the right and left inner closed cross sectional portions, operation stability of the vehicle can be enhanced by reducing rocking of the vehicle understructure when the steering wheel is turned or during driving. When the object is considered in this way, the embodiments are not limited to those with a tank disposed under the floor tunnel. For example, as shown in FIGS. 18 and 19, another element such as an exhaust pipe 192, a battery, or a drive shaft may be disposed under the floor tunnel 28.

Figure 18:
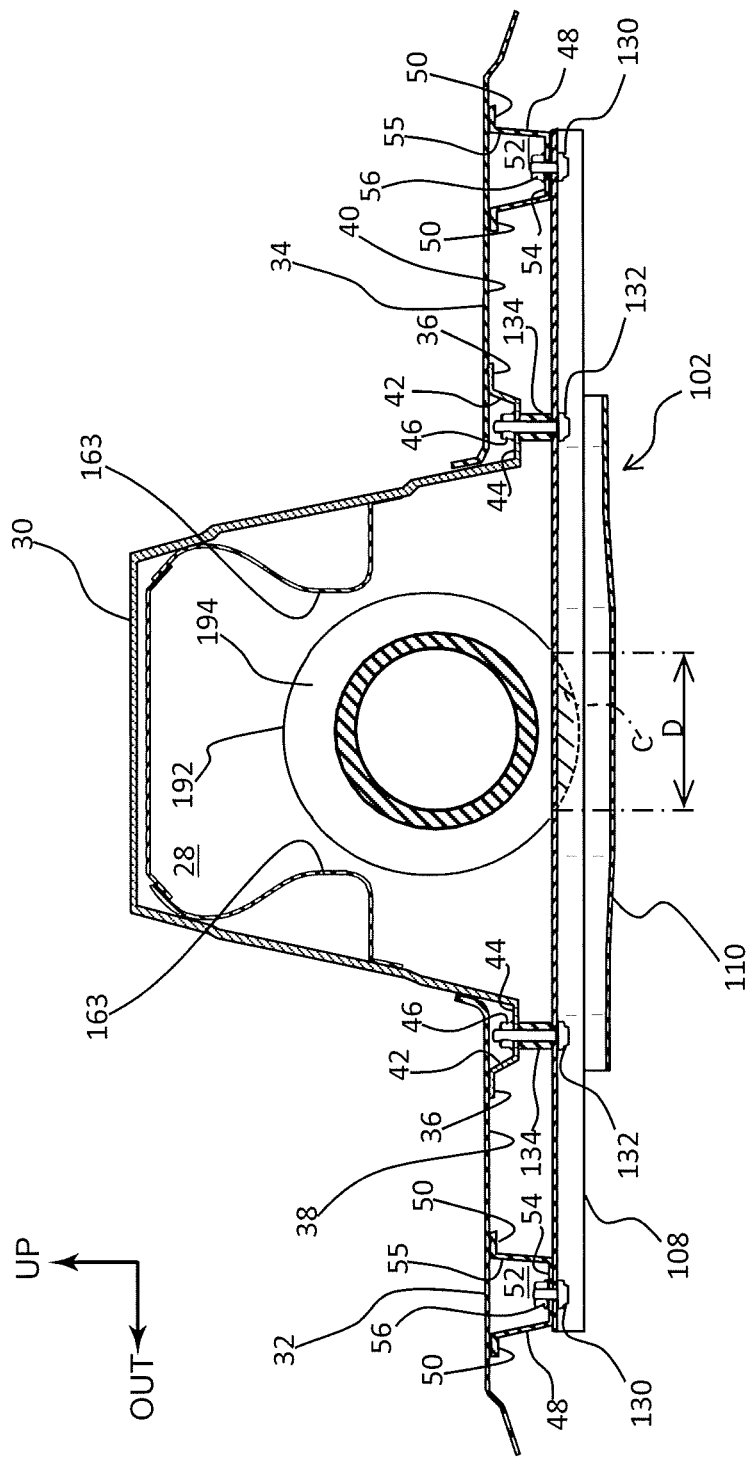
FIG. 18 is a rear view of a portion of a vehicle underbody from a different point of view, corresponding to FIG. 3 in the first embodiment.
Figure 19:
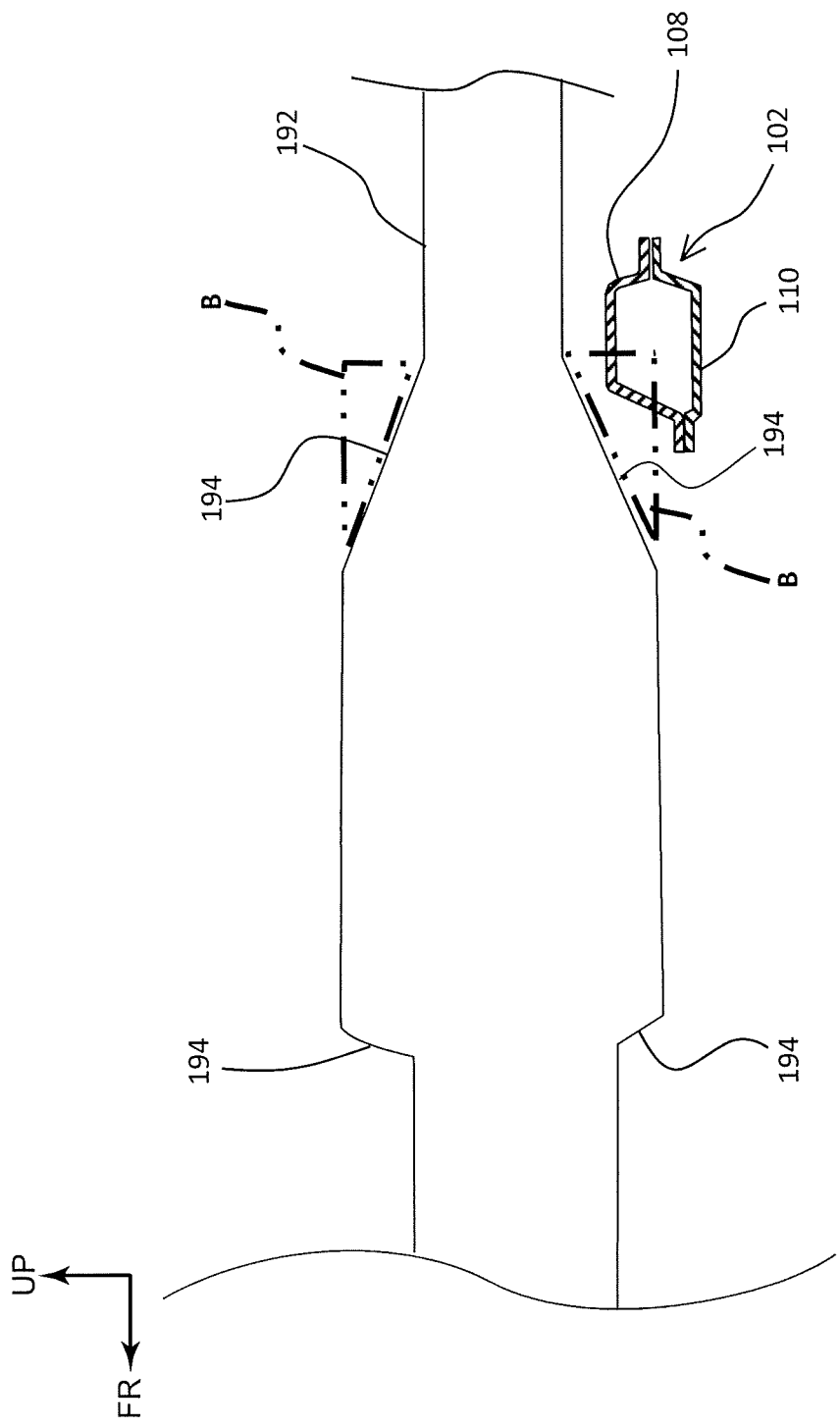
FIG. 19 is a side view of a portion of a vehicle underbody from a different point of view, corresponding to FIG. 9 in the first embodiment.

The shaded region C in FIG. 18 represents an area where the brace 102 is overlapped with a diameter increasing portion 194 of the exhaust pipe 192, when viewed from the front or rear of the vehicle. The diameter of the exhaust pipe 192 changes along the longitudinal axis of the vehicle in the diameter increasing portion 194. A section D indicated with two leader lines is a transverse section where the brace 102 overlaps the diameter increasing portion 194 when viewed from the front or rear of the vehicle. In FIG. 19, the dash-dot-dot line enclosing portions B represent a conceptual area where the brace 102 overlaps the diameter increasing portion 194 when viewed from the front or rear of the vehicle and from the top or bottom of the vehicle. In this embodiment, the brace 102 is positioned to be at least partially overlapped with the diameter increasing portion 194 when viewed from the front or rear of the vehicle and also from the top and the bottom of the vehicle. In this way, because the brace 102 can be disposed in the space around the diameter increasing portion 194, the amount of downward protrusion of the brace 102 below the exhaust pipe 192 can be reduced. The present disclosure is not limited to the diameter increasing portion 194. The exhaust pipe 192 may include a curved or bent portion that forms a step portion. The brace 102 may be positioned to overlap the step portion when viewed from the front or rear of the vehicle.

The understructure according to the above described embodiments can be partially considered from yet another point of view. For example, an object to be achieved by the understructure according to the first embodiment or the second embodiment may also be considered to enhance operational stability of the vehicle by reducing torsional deformation of the reinforcement element secured to both of the transversely outer side portions of the floor tunnel due to a load applied around the joints, when the steering wheel is turned or during driving.

When the object is considered in this way, the means for achieving the object becomes, for example, as follows.

"A vehicle understructure comprising:

right and left rocker panels extending along a longitudinal axis of a vehicle on both of transversely outer sides of the vehicle and forming a vehicle body frame;

a floor tunnel forming a transverse center portion of a floor panel between the right and left rocker panels, the floor tunnel extending along the longitudinal axis of the vehicle and being downwardly opened; and a reinforcing member extending along a transverse axis of the vehicle and being secured to both of transversely outer side portions of the floor tunnel, and forming a closed cross sectional portion when viewed from a side of the vehicle, the closed cross sectional portion extending along the transverse axis of the vehicle across the joints where the reinforcing member is secured to the transversely outer side portion of the floor tunnel.

According to the above structure, because the closed cross sectional portion of the reinforcing member extends along the transverse axis of the vehicle across the joints where the reinforcing member is secured to both of the transversely outer side portions of the floor tunnel, the rigidity of the reinforcing member around the joints of the reinforcing member can be enhanced. In this way, operational stability of the vehicle can be enhanced by reducing a torsional deformation of the reinforcing member due to loads transmitted from around the joints. When the object is considered in this way, the embodiments are not limited to those with a tank disposed under the floor tunnel. For example, as shown in FIGS. 18 and 19, another element such as the exhaust pipe 192, a battery, or a drive shaft may be disposed under the floor tunnel 28.

The invention claimed is:

1. A vehicle understructure comprising:
    right and left rocker panels extending along a longitudinal axis of a vehicle on both of transversely outer sides of the vehicle and forming a vehicle body frame;
    a floor tunnel forming a substantially transverse center portion of a floor panel between the right and left rocker panels, the floor tunnel extending along the longitudinal axis of the vehicle and being downwardly opened;
    a tank with at least an upper portion being enclosed in the floor tunnel, the tank disposed along the longitudinal axis of the vehicle, the tank comprising two dome portions disposed at both ends of the tank on a first and a second sides of a longitudinally centered cylindrical body portion, and at least one valve portion protruding from the dome portion at least on the first side; and
    a reinforcing member extending along a transverse axis of the vehicle and being secured to both of transversely outer side portions of the floor tunnel, the reinforcing member being at least partially overlapped with at least one of the dome portions when viewed from the front or rear of the vehicle.

2. The vehicle underbody according to claim 1, wherein the reinforcing member is positioned to be at least partially overlapped with at least one of the dome portions when viewed from the front or rear of the vehicle, and also with at least one of the dome portions or the at least one valve portion when viewed from the top or bottom of the vehicle.

3. The vehicle underbody according to claim 2, wherein the vehicle underbody further comprises
- a holder holding the tank on the first side of the tank center of gravity of the tank, the holder being configured to release the tank in response to a longitudinal relative movement between the floor tunnel and the tank, and
- a tank band holding the tank on the second side of the tank to the center of gravity of the tank, the reinforcing member is disposed on at least the first side of the tank.

4. The vehicle underbody according to claim 2, wherein the reinforcing member is curved in a section where the reinforcing member is overlapped with at least one of the dome portions when viewed from the front or rear of the vehicle to protrude to be away from the body portion of the tank in comparison with both ends of the reinforcing member, and
an edge of the reinforcing member facing the body portion of the tank is curved downward to be lower than both of the ends of the reinforcing member at least partially in a transverse section where the reinforcing member is overlapped with at least one of the dome portions of the tank when viewed from the front or rear of the vehicle.

5. The vehicle underbody according to claim 3, wherein the reinforcing member is curved in a section where the reinforcing member is overlapped with at least one of the dome portions when viewed from the front or rear of the vehicle to protrude to be away from the body portion of the tank in comparison with both ends of the reinforcing member, and
an edge of the reinforcing member facing the body portion of the tank is curved downward to be lower than both of the ends of the reinforcing member at least partially in a transverse section where the reinforcing member is overlapped with at least one of the dome portions of the tank when viewed from the front or rear of the vehicle.

6. The vehicle underbody according to claim 1, wherein the vehicle underbody further comprises
- right and left inner closed cross sectional portions extending along the longitudinal axis of the vehicle on both transversely outer sides of the floor tunnel, each of the inner closed cross sectional portions forming a closed cross section with the floor panel when viewed from the front or rear of the vehicle, and
- right and left outer closed cross sectional portions extending along the longitudinal axis of the vehicle on transversely inner sides to the right and left rocker panels and on transversely outer sides to the right and left inner closed cross sectional portions, each of the outer closed cross sectional portions forming a closed cross section with the floor panel when viewed from the front or rear of the vehicle, and the reinforcing member is secured to the right and left inner closed cross sectional portions and the right and left outer closed cross sectional portions.

7. The vehicle underbody according to claim 6, wherein the floor panel comprises
- a tunnel panel forming the floor tunnel, and
- right and left floor panels disposed on transversely outer sides of the tunnel panel and coupled to the tunnel panel from the transversely outer sides, the tunnel panel comprises
- right and left side edges that are both bent back upwards,
- a right side flange extending transversely outwards from the right side edge,
- a left side flange extending transversely outwards from the left side edge, and the right inner closed cross sectional portion is formed between the tunnel panel and the right floor panel by coupling the right side flange to a lower surface of the right floor panel,
the left inner closed cross sectional portion is formed between the tunnel panel and the left floor panel by coupling the left side flange to a lower surface of the left floor panel,
right and left under reinforcements extending along the longitudinal axis of the vehicle, respectively disposed on transversely outer sides of the right and left inner closed cross sectional portions, the right under reinforcement being coupled to the lower surface of the right floor panel, and the left under reinforcement being coupled to the lower surface of the left floor panel,
the right outer closed cross sectional portion is formed between the right under reinforcement and the right floor panel, and
the left outer closed cross sectional portion is formed between the left under reinforcement and the left floor panel.

8. The vehicle underbody according to claim 7, wherein
a floor cross member extending along the transverse axis of the vehicle is connected to rear end portions of the right and left floor panels, and also to rear end portions of the right and left rocker panels, and the floor cross member comprises a bottom surface facing downward and a rear surface facing rearward,
two rear end brackets are attached to rear end portions of the right and left under reinforcements and also to the bottom surface and the rear surface of the floor cross member, and each of the two rear end brackets has a substantially L-shape when viewed from a side of the vehicle,
the valve portion is disposed between the rear end portions of the right and left under reinforcements, and
the reinforcing member is disposed to be overlapped with the at least one valve portion when viewed from the top or bottom of the vehicle.

9. The vehicle underbody according to claim 6, wherein the reinforcing member substantially linearly extends along the transverse axis of the vehicle when viewed from the front or rear of the vehicle between right and left joints where the reinforcing member is secured to the right and left outer closed cross sectional portions.

10. The vehicle underbody according to claim 1, wherein the reinforcing member comprises
- a first reinforcing element secured to both of the transversely outer side portions of the floor tunnel,
- a second reinforcing element coupled to the first reinforcing element, and transversely extending along the first reinforcing element, the first reinforcing element and the second reinforcing element are at least partially overlapped with each other and further with at least one of the dome portions or the at least one valve portion when viewed from the top or bottom of the vehicle.

11. The vehicle underbody according to claim 10, wherein the first reinforcing element and the second reinforcing element are coupled to each other to form a closed cross sectional portion having a closed cross section when viewed from a side of the vehicle, and the closed cross sectional portion of the first and the second reinforcing elements extends along the transverse axis of the vehicle and is overlapped with at least one of the dome portions or the at least one valve portion at least when viewed from the top or bottom of the vehicle.

12. The vehicle underbody according to claim 11, wherein the second reinforcing element extends further on transversely outer sides than joints where the first reinforcing element is attached to the transversely outer side portions of the floor tunnel, and the closed cross sectional portion extends further on transversely outer sides than the joints where the first reinforcing element is attached to the transversely outer side portions of the floor tunnel.

* * * * *